United States Patent [19]

Hershey et al.

[11] Patent Number: 5,594,728
[45] Date of Patent: Jan. 14, 1997

[54] REALTIME ADDRESSING FOR HIGH SPEED SERIAL BIT STREAM

[75] Inventors: Paul C. Hershey, Manassas, Va.; John G. Waclawsky, Frederick, Md.

[73] Assignee: International Business Machines Corporation, Armonk, N.Y.

[21] Appl. No.: 551,283

[22] Filed: Oct. 31, 1995

Related U.S. Application Data

[63] Continuation of Ser. No. 188,167, Jan. 26, 1994, abandoned.
[51] Int. Cl.[6] .......................... H04L 12/417; H04L 12/46
[52] U.S. Cl. .............................................................. 370/471
[58] Field of Search ................................. 370/85.4, 85.5, 370/85.12, 85.13, 85.14, 79, 82, 92, 94.1, 60; 340/825.52, 825.05

[56] References Cited

U.S. PATENT DOCUMENTS

| | | | |
|---|---|---|---|
| 4,227,245 | 10/1980 | Edbland et al. | 364/468 |
| 4,458,309 | 7/1984 | Wilder, Jr. | 364/DIG. 1 |
| 4,459,656 | 7/1984 | Wilder, Jr. | 364/DIG. 1 |
| 4,521,849 | 6/1985 | Wilder, Jr. | 364/DIG. 1 |
| 4,621,362 | 11/1986 | Sy | 370/85.14 |
| 4,779,194 | 10/1988 | Jennings et al. | 364/DIG. 1 |
| 4,805,089 | 2/1989 | Lane et al. | 364/188 |
| 4,851,998 | 7/1989 | Hospodor | 364/580 |
| 4,901,312 | 2/1990 | Hui et al. | 370/85.12 |
| 4,905,171 | 2/1990 | Kiel et al. | 364/551.01 |
| 4,939,724 | 7/1990 | Ebersole | 370/85.15 |
| 4,944,038 | 7/1990 | Hardy et al. | 370/85.15 |
| 4,980,824 | 12/1990 | Tulpule et al. | 364/DIG. 2 |
| 5,035,302 | 7/1991 | Thangavelu | 187/125 |
| 5,062,055 | 10/1991 | Chinnaswamy et al. | 364/DIG. 1 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,251,213 | 10/1993 | Videlock et al. | 370/85.14 |
| 5,365,514 | 11/1994 | Hershey et al. | 370/17 |
| 5,375,070 | 12/1994 | Hershey et al. | 364/550 |

FOREIGN PATENT DOCUMENTS 61-53855  3/1986  Japan .

*Primary Examiner*—Douglas W. Olms
*Assistant Examiner*—Chau T. Nguyen
*Attorney, Agent, or Firm*—Joseph C. Redmond, Jr.; John D. Flynn

[57] ABSTRACT

The invention includes indirect addressing which is the realtime calculation of the location of variably offset fields in a frame in a high speed medium. Data frames in a communication medium, include a presence bit which indicates the presence of a variable length field whose length is defined by a length field in the data frame. In accordance with the invention, an Event Driven Interface has its input coupled to the data communications network, to receive the data frame and to identify the presence of the presence bit. In response to this, the Event Driven Interface branches to a first logic path which ignores the plurality of bits in the variable length field corresponding to the length field. Then, the Event Driven Interface branches to a second logic path after the plurality of bits have been ignored, to locate the variably offset field being sought in the data frame. This enables the realtime location of data at variable offsets in the data frame.

6 Claims, 26 Drawing Sheets

DATA FRAME FORMAT

EDI SCHEMATIC FOR REALTIME INDIRECT ADDRESSING

EDI (LOOPING FEATURE)

IBM TOKEN-RING NETWORK FRAME FORMAT. SD IS THE STARTING DELIMITER; AC IS THE ACCESS CONTROL FIELD; FC IS THE FRAME CONTROL FIELD; ED IS THE ENDING DELIMITER; AND FS IS THE FRAME STATUS FIELD.

INDIRECT ADDRESSING
(IEEE 802.5 ROUTING INDICATOR)

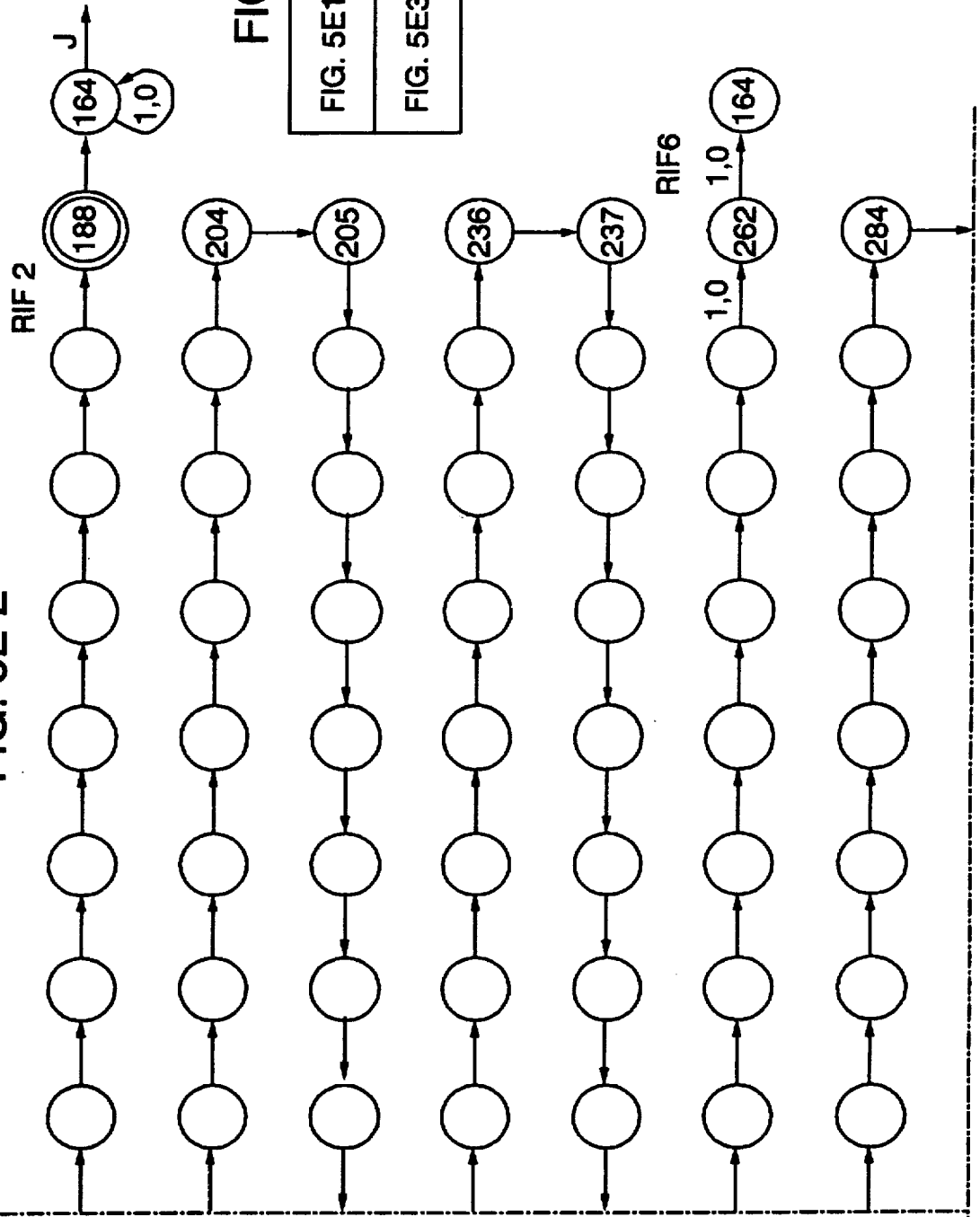

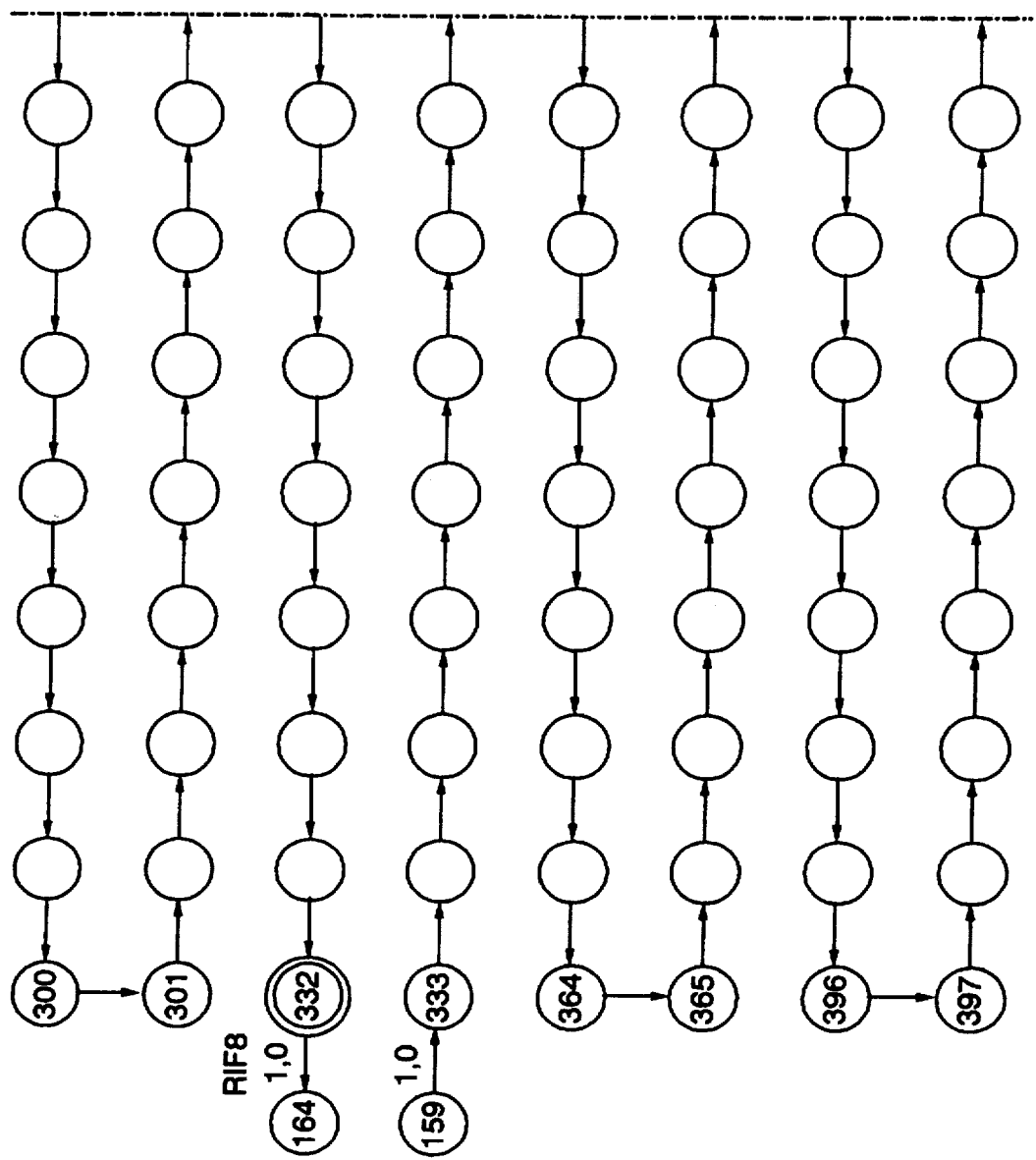

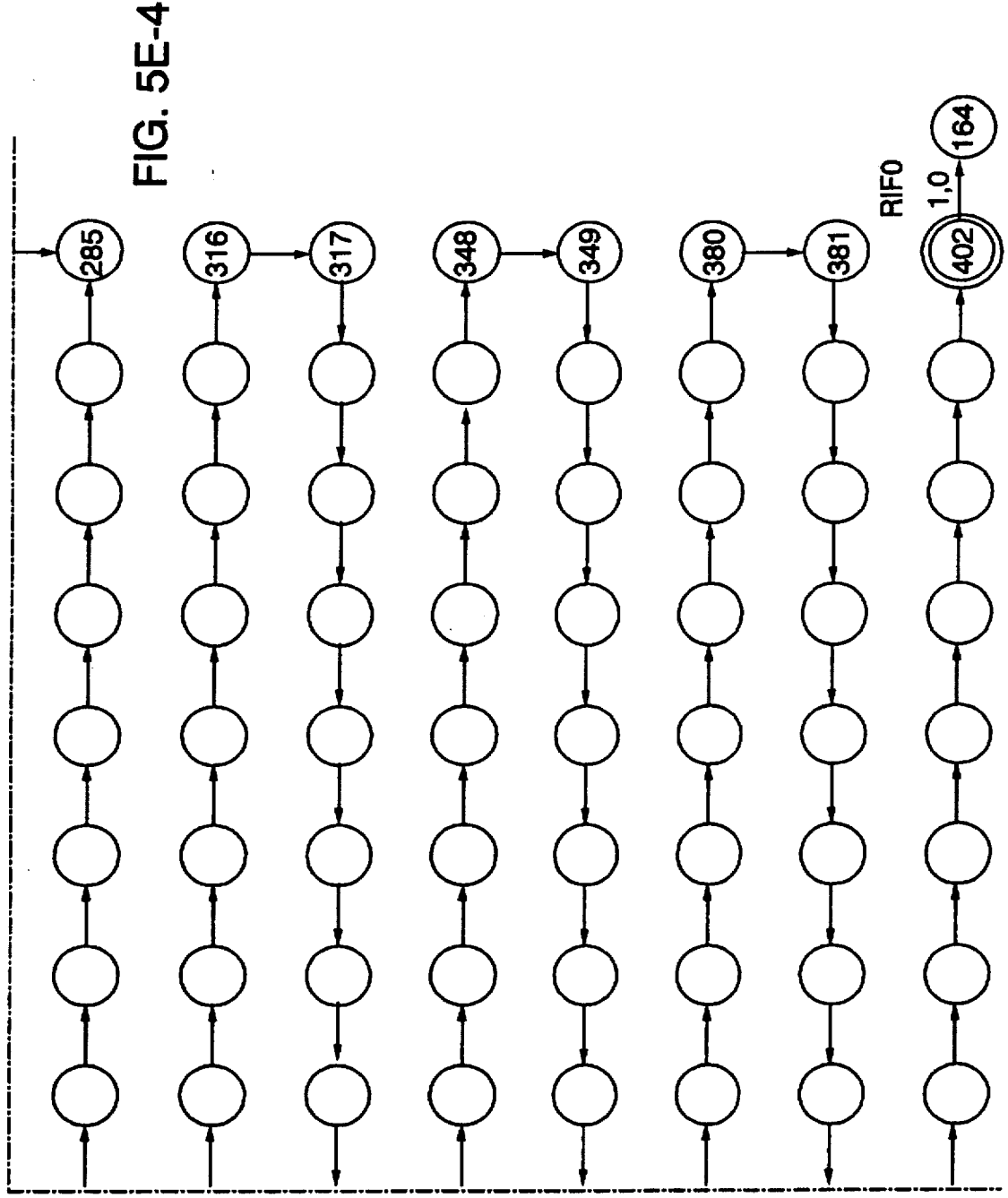

| FIG. 5F1 | FIG. 5F2 |
| --- | --- |
| FIG. 5F3 | FIG. 5F4 |

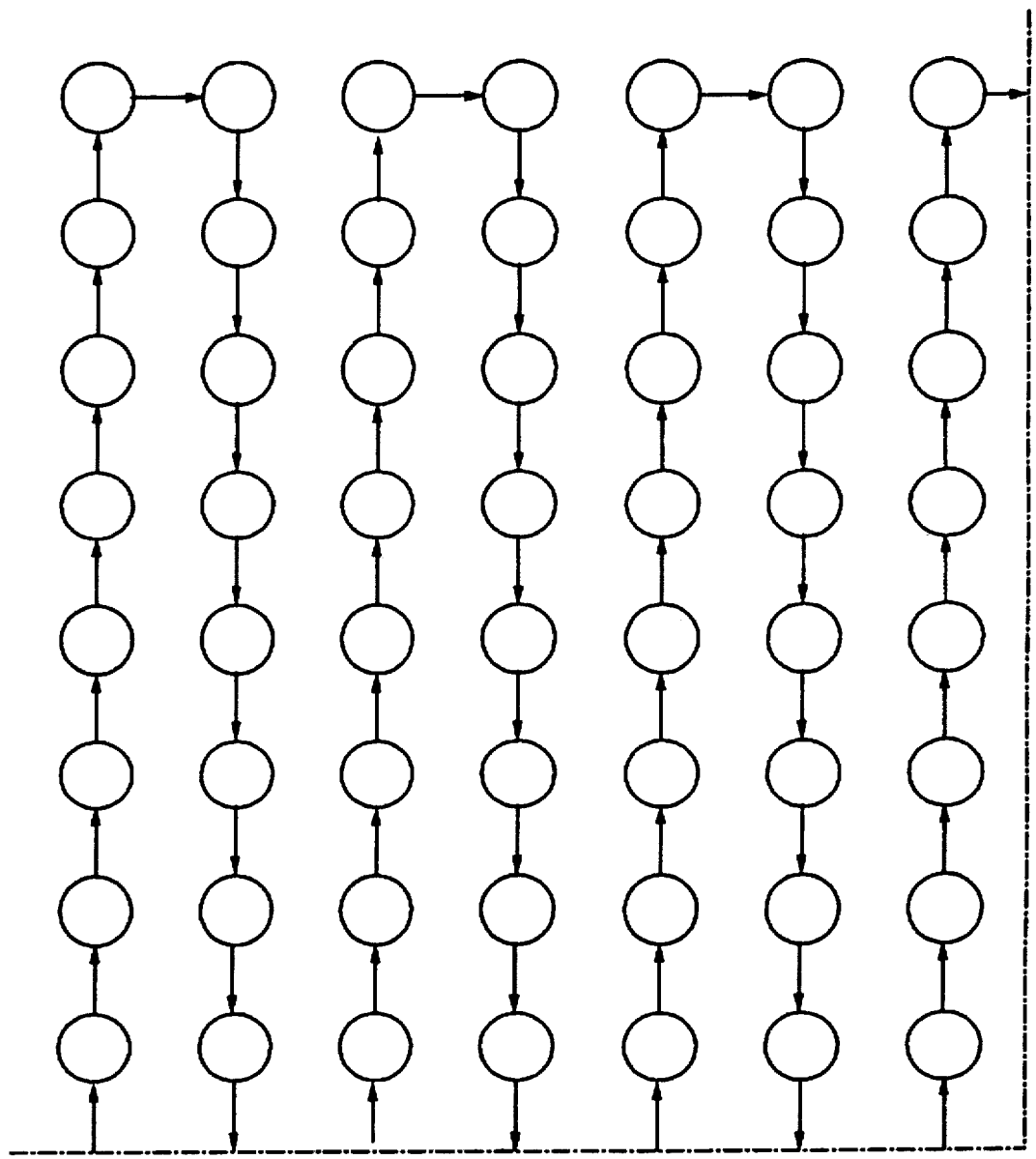

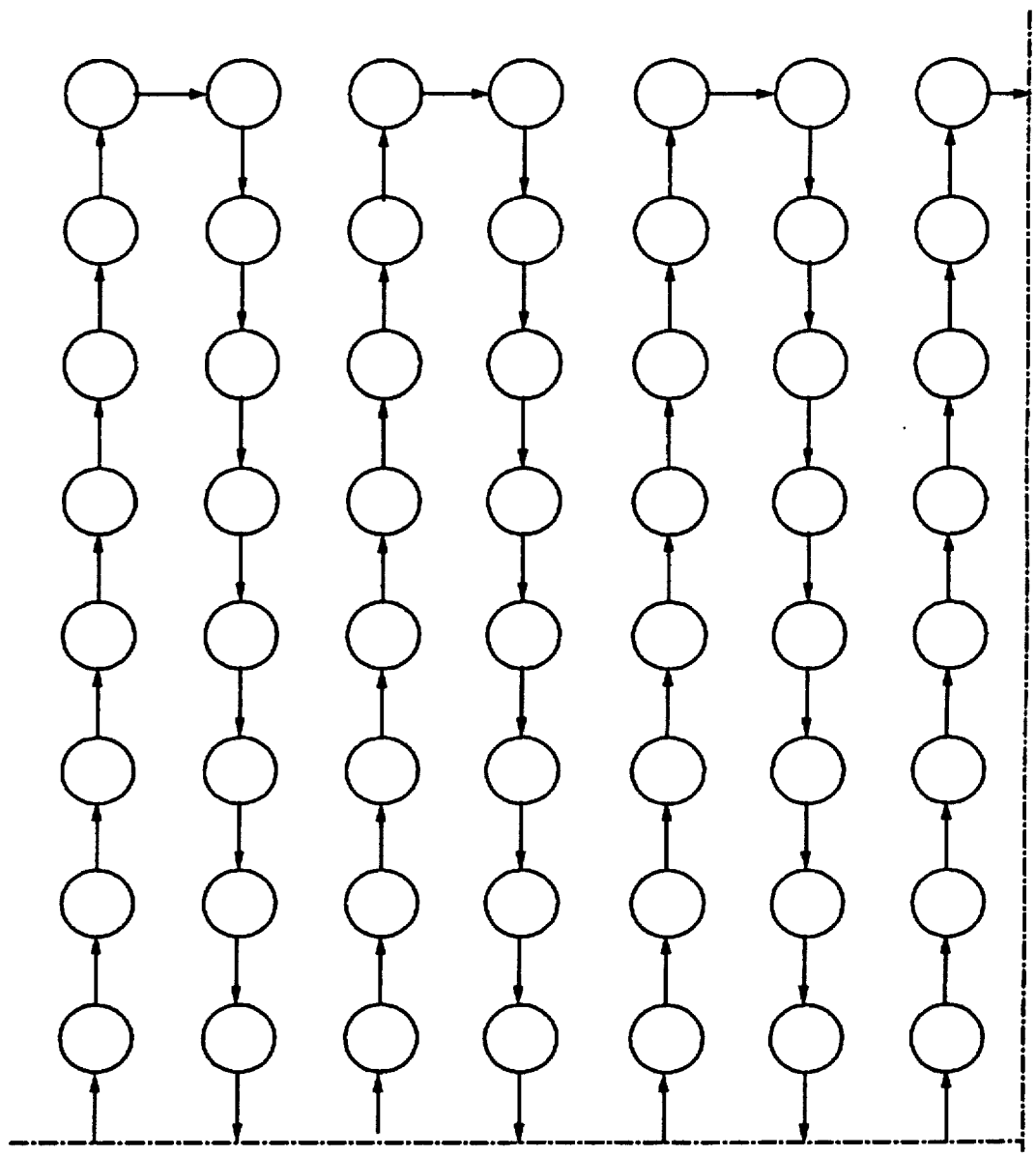

FIG. 6
ROUTING INFORMATION FIELD

FOLLOWING THE SOURCE ADDRESS IS THE OPTIONAL ROUTING INFORMATION FIELD; THIS FIELD IS OMITTED IF THE FRAME IS NOT GOING TO LEAVE THE SOURCE RING. THIS FIELD WHEN PRESENT IS SHOWN BELOW.

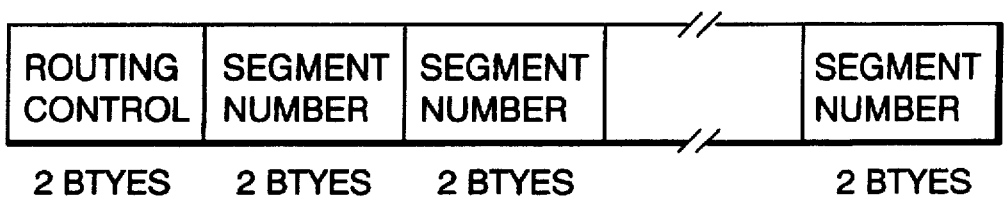

FIG. 7
ROUTING CONTROL FIELD

THE FORMAT FOR THE ROUTING CONTROL FIELD IS SHOWN BELOW:

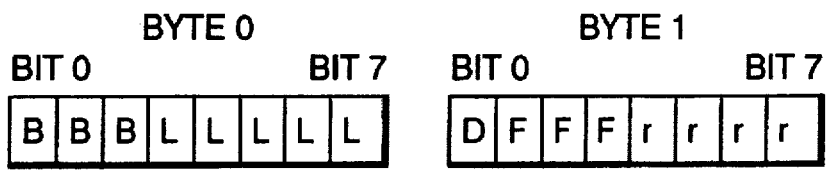

B = BROADCAST INDICATORS
L = LENGTH BITS
D = DIRECTION BIT
F = LARGEST FRAME BITS
r = RESERVED BITS

REALTIME ADDRESSING FOR HIGH SPEED SERIAL BIT STREAM

This application is a continuation of Ser. No. 08/188,167, filed on Jan. 26, 1994, abandoned.

BACKGROUND OF THE INVENTION

1. Technical Field

The invention disclosed broadly relates to the extraction of information from large bodies of data for high speed communication facilities and more particularly relates to realtime indirect addressing for high speed serial bit streams.

2. Related Patent Applications

This patent application is related to the U.S. patent application Ser. No. 08/024,572, filed Mar. 1, 1993, entitled "Information Collection Architecture and Method for a Data Communications Network," by J. G. Waclawsky, et al., (now U.S. Pat. No. 5,375,070 issued Dec. 20, 1994) assigned to the IBM Corporation and incorporated herein by reference.

This patent application is also related to the U.S. patent application Ser. No. 08/024,563, filed Mar. 1, 1993, abandoned, entitled "Event Driven Interface for a System for Monitoring and Controlling a Data Communications Network," by P. C. Hershey, et al., assigned to the IBM Corporation and incorporated herein by reference.

This patent application is also related to the U.S. patent application Ser. No. 08/024,542, filed Mar. 1, 1993, U.S. Pat. No. 5,493,689, entitled "System and Method for Configuring an Event Driven Interface and Analyzing Its Output for Monitoring and Controlling a Data Communications Network," by J. G. Waclawsky, et al., assigned to the IBM Corporation and incorporated herein by reference.

This patent application is also related to the copending U.S. patent application Ser. No. 08/138,045, filed Oct. 15, 1993, entitled "System and Method for Adaptive, Active Monitoring of a Serial Data Stream Having a Characteristic Pattern," by P. C. Hershey, et al., assigned to the IBM Corporation and incorporated herein by reference.

3. BACKGROUND INFORMATION

The invention disclosed herein is related to the U.S. patent application Ser. No. 08/024,575, filed Mar. 1, 1993 entitled "Event Driven Interface for a System for Monitoring and Controlling a Data Communications Network" by P. C. Hershey, et al., (now U.S. Pat. No. 5,365,514 issued Nov. 14, 1994) assigned to the IBM Corporation and incorporated herein by reference.

In the prior art data communications networks such as the IBM token ring network, for example, a data frame will include a destination address field and an information field. If the data frame is to remain within the same token ring network, then there is no additional routing information necessary to accomplish transferring the data frame from the source to the destination nodes. However, if a first token ring network is connected by means of a bridge to a second token ring network, where the second token ring network has a different address base than does the first token ring network, then additional routing information is necessary in the data frame. An additional routing information will include information related to the address of the destination node in the second token ring network. It can be seen that as additional token ring networks are connected by corresponding bridges, that as consecutive networks must be traversed to transport a data frame from a source node to a destination node, the size of the routing information in the data frame increases. This can be seen to be a variably sized field within the data frame. In the prior art, the routing information and other fields within the data frame would be analyzed by receiving the data frame in a buffer and through appropriate programs in the receiving node, analyzing the respective fields of the frame to extract destination address information, routing information, and information in the information field itself. If the location of some of the fields such as the information field depends upon a variably sized intervening field such as routing field, then the programs in the preceding node would take that into consideration in locating the information field being sought.

What is needed in the prior art is a means to locate and interpret fields in a data stream on a realtime basis, even if variably sized intervening fields occur in the data frame.

OBJECTS OF THE INVENTION

It is therefore an object of the invention to provide an improved technique to locate and interpret fields in a data frame of a bit stream.

It is another object of the invention to provide an improved technique to locate and interpret fields in a data frame containing variably sized intervening fields.

SUMMARY OF THE INVENTION

These and other objects, features and advantages are accomplished by the invention. The invention is a system, method and apparatus to locate on a realtime basis, information fields whose position within a data frame depends upon the variably sized intervening fields which may be also in the frame. This is accomplished by the use of an Event Driven Interface, a dynamically reprogrammable passive digital filter (DRPDF) whose serial input is connected to the serial bit stream. In accordance with the invention, the data frame will include a presence bit contained at a fixed or predetermined offset from the beginning of the data frame. The presence bit will indicate whether a length field is present which states how long a variable length field is which may occupy the data frame. If the presence bit is on, then the length field will have a numeric value which represents the length of a variable field contained in the data frame. In accordance with the invention, the serial input of the Event Driven Interface will receive the serial bit stream representing the data frame. The Event Driven Interface will be programmed to look for the presence of the presence bit and to steer the bit stream within the Event Driven Interface to one of two paths depending upon the value of the presence bit. If the presence bit is on, then the serial bit stream is steered into a path which processes or captures the length field. The captured length field is then processed in one of two ways. In a first embodiment of the invention, the bits in the length field are propagated along a path in the Event Driven Interface which provides a loop to loop through a number of "ignore states" corresponding to the number of bits in the variable length field. In this embodiment, the Event Driven Interface has its address register, in combination with random access memory embodying the Event Driven Interface, cyclically count for as many ignore states as are represented by the length of the variably length field. In the second embodiment of the invention, a separate hardware counter is associated with the Event Driven Interface. When the presence bit is detected in the data frame, the contents of the length field are loaded into the hardware counter. The hardware counter is clocked by the same clock which serves to clock the Event Driven Interface. The hardware counter decrements the quantity that has been stored in it representing the length of the variable length field. After the hardware counter counts down to zero, the variable length field will have passed in the serial bit stream. Then the hardware counter branches back to an appropriate path within the Event Driven Interface to continue with the analysis and pattern recognition of the information fields which are sought in the data frame.

This invention extends the architecture of the previous Information Collection Architecture (ICA) patent application Ser. Nos. 08/024,572, 08/024,575 and 08/024,542 to include the capability to detect and capture a characteristic data pattern after a different characteristic data pattern has already been detected. This invention uses finite state machines (FSMs) in the same manner that patent application Ser. No. 08/175,854, filed Dec. 12, 1993 uses them in order to detect communication protocol specific characteristic data patterns.

In addition, this invention detects additional characteristic data patterns based on the occurrence of a first characteristic data pattern. This invention is useful for such applications as identifying the protocol specific type of frame that has been sent over the network such as a TCPIP frame; an IEEE 802.5 frame; an FDDI frame; a DQDB frame; a token bus frame, a CSMA/CD frame, or a SONET frame.

DESCRIPTION OF THE FIGURES

These and other objects, features and advantages are accomplished by the invention and will become clear with reference to the accompanying drawings.

FIG. 6 illustrates the routing information field format.

FIG. 7 illustrates the routing control field format.

DISCUSSION OF THE PREFERRED EMBODIMENT

Figure 1:
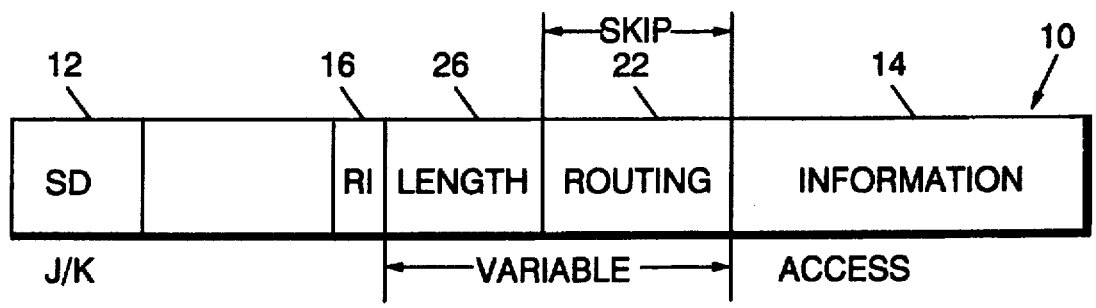
FIG. 1 is a format diagram of a data frame which includes a presence bit and a length field and a variable length field.

The term indirect addressing as used herein means the realtime calculation of the location of variably offset fields in a data frame on a high speed serial communications medium.

The problem solved is the identification of a data portion in a serial bit stream whose location is defined by a format header located elsewhere in the serial bit stream.

This particular invention will allow us to access, as one example, the information field contained within a token ring frame. This is one of many embodiments of this invention. For example, to find the information field in a frame is a dependency of whether the individual frame leaves the token ring or not. If it does not leave the token ring, then the information field is a fixed offset from the starting delimiter and the starting delimiter can be easily identified by looking for code J/K violations in the bit stream. From the point of the code violation to the information field is a known value. However, if the frame leaves the token ring, then these is a routing field that is present within a frame and the routing field has a variable size, the size depends on where the ultimate destination of the information is, how many intervening token rings or bridges the frame crosses. What needs to be done to find the information field is to check to see if the routing indicator is on in a frame. If the routing indicator is one, then we need to take a look at the length field which is the first field before the routing information of the frame and the length field can be used as an offset to find the information field. The information field will not be where it normally is placed. It will be offset by the contents of routing information.

This invention is an improvement on the Event Driven Interface (EDI) of the above cited Ser. No. 08/024,575(now U.S. Pat. No. 5,365,514 issued Nov. 14, 1994). In the accompanying figure, a frame is shown (frame 10) which contains a beginning header 12 which among other things, will include a specification for the location of a field 14 which is desired to be analyzed by the EDI or by other logic. The problem is that the position of the information 14 is not fixed with respect to the beginning of the frame 12. The location for the information 14 is specified in the routing indicator (RI) field 16. This is for a token ring implementation.

Figure 2:
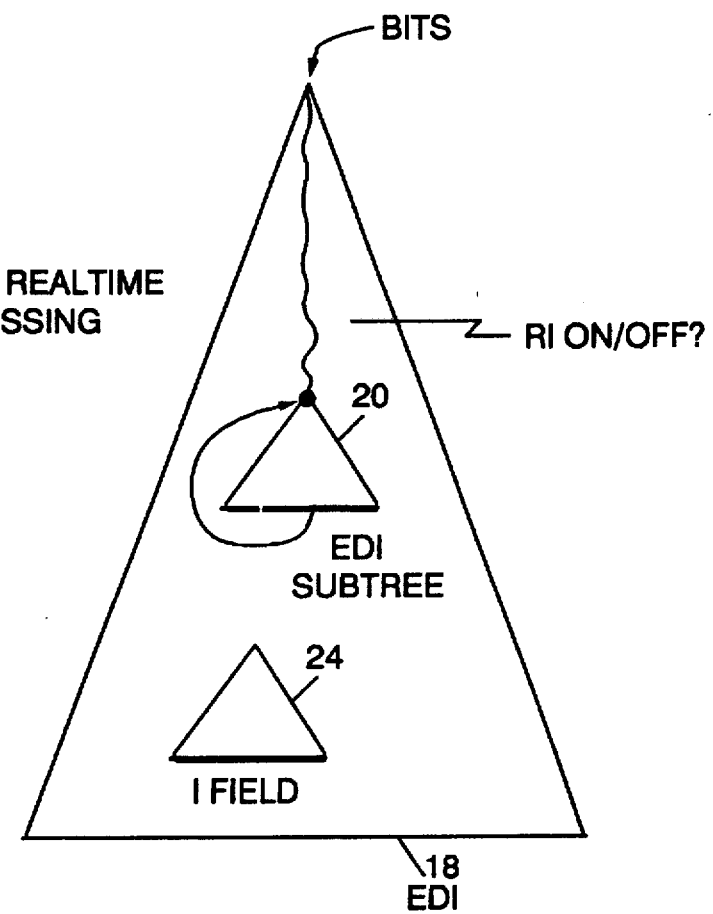
FIG. 2 is a schematic diagram of an Event Driven Interface illustrating the overall concept of realtime indirect addressing.

The accompanying FIG. 2 shows the Event Driven Interface 18 which has a serial bit input connected to the network link for receiving the serial bit stream, including the serial sequence of bits representing the frame 10. The serial bits are subjected to pattern recognition in the same manner as was described in U.S. Pat. No. 5,365,514). When the frame 10 is identified by tree will detect the patterns of the bits up to the point where the routing indicator 16 is located. Then, in accordance with the invention, the routing indicator 16 detects the bit which determines whether the frame is a communication within this network or whether it is a communication from this network to another network over a bridge or gateway.

The EDI 18 includes an indirect addressing subtree EDI 20, which is shown within the lines for the EDI 18 and which is also shown in magnified view on the attached FIG. 2. The subtree EDI 20 will begin with the determination of whether this is an intra communication or inter network communication frame. If it is an intra communication frame so that the frame remains within this network, then the size of the routing field 22 is fixed and the top apex of the EDI subtree 20 will route the logic flow to the I field location 24 shown in the figure. This will allow the intervening fixed number of bits to be ignored so that the desired information 14 can then be subjected to pattern recognition in the rest of the EDI 18.

Figure 3:
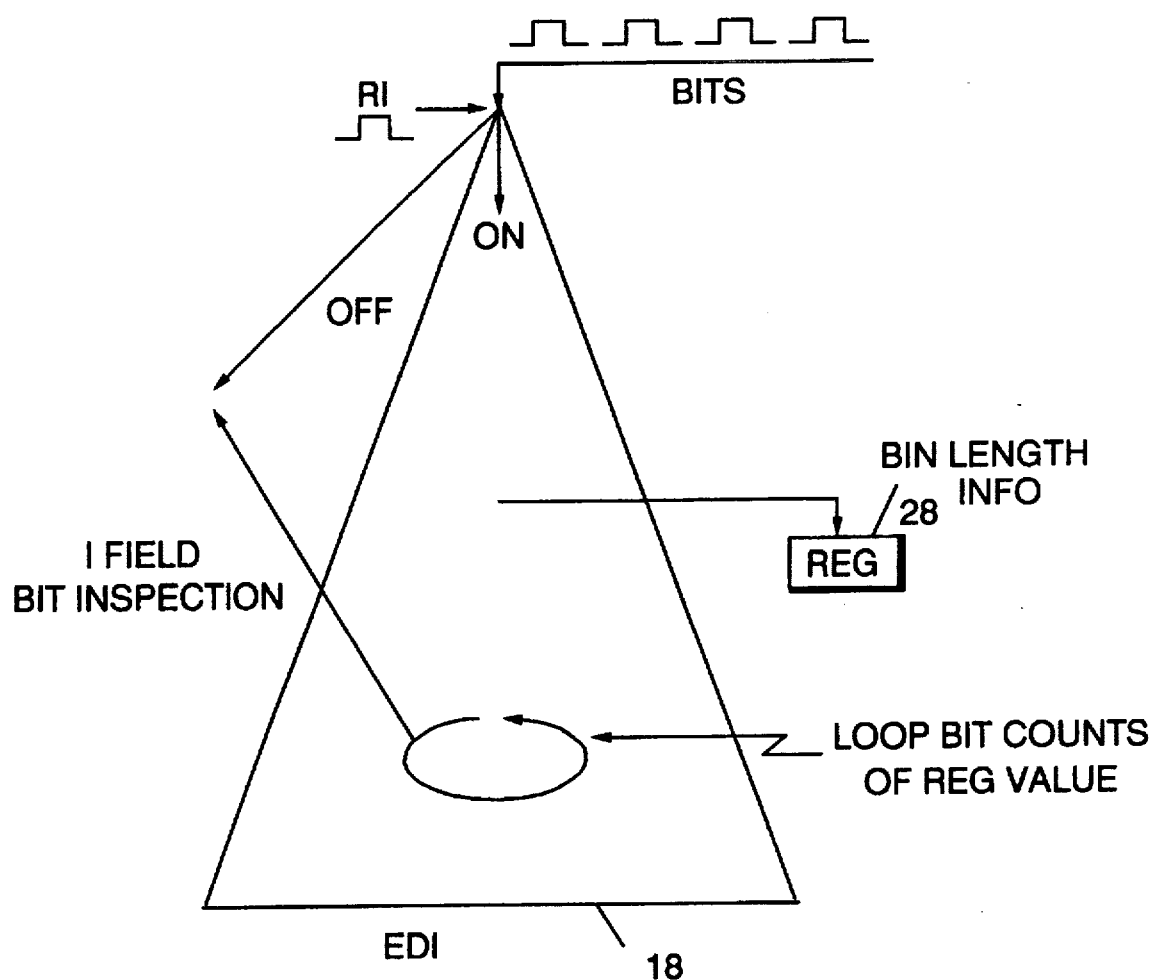
FIG. 3 is a more detailed view of a portion of the Event Driven Interface shown in FIG. 2, which concentrates on the looping feature of ignoring consecutive bits in a variable length field.
Figure 3A:
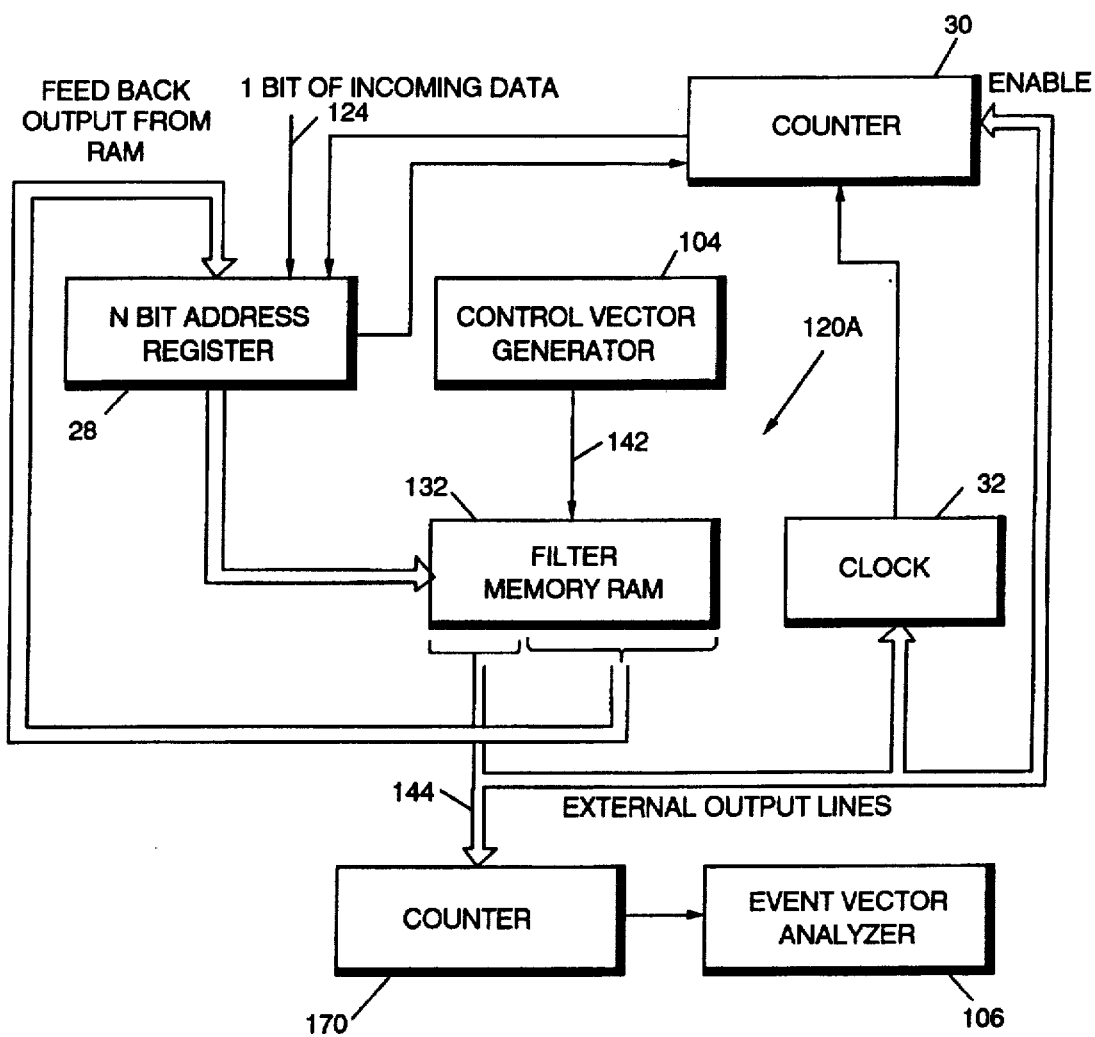
FIG. 3A is a block diagram of another embodiment which implements the invention.

Alternately, however, if the intra/inter communication bit is on indicating that this is a frame which is intended to go to another network, then the size of the intervening number of bits in the field 22 is variable. In accordance with the invention as shown in FIG. 3, since the field 22 is of a variable size, the subtree EDI 20 will store the length field 26 which indicates the length of the routing field 22, in the register 28. The register 28 is the address register for the memory of the EDI, as shown in FIG. 3A, and described in U.S. Pat. No. 5,365,514. This starts a loop which ignores the number of bits in the frame corresponding to the variable size routing field 22 using a counter 30. The counter 30 is clocked by a clock 32 which serves the Event Driven Interface. After that number of bits has passed into the EDI 18 from the network, then the subtree EDI 20 exits the loop and rejoins the I field bit position 24 in the EDI 18. In this manner, the information contained in the field 14 can now be subjected to pattern analysis by the EDI 18, in spite of the variable sized routing field 22 which separates the information field 14 from the beginning of the frame 12. In summary, this is a method for finding variably placed information in high speed bit streams.

We provide an example of indirect addressing for the IEEE 802.5 protocol. The frame format for an IBM 802.5 token ring network is given in FIG. 4. For this example we will determine where to look in the frame for the protocol specific frame identification information. To accomplish we must detect the routing indicator bit and the broadcast indicator bits for each frame. The routing indicator bit identifies when the routing information field is present. The broadcast indicator bits identify whether the frame is to be sent along a specified path to all segments in a network with either single or multiple copies on each network segment.

Figure 5A:
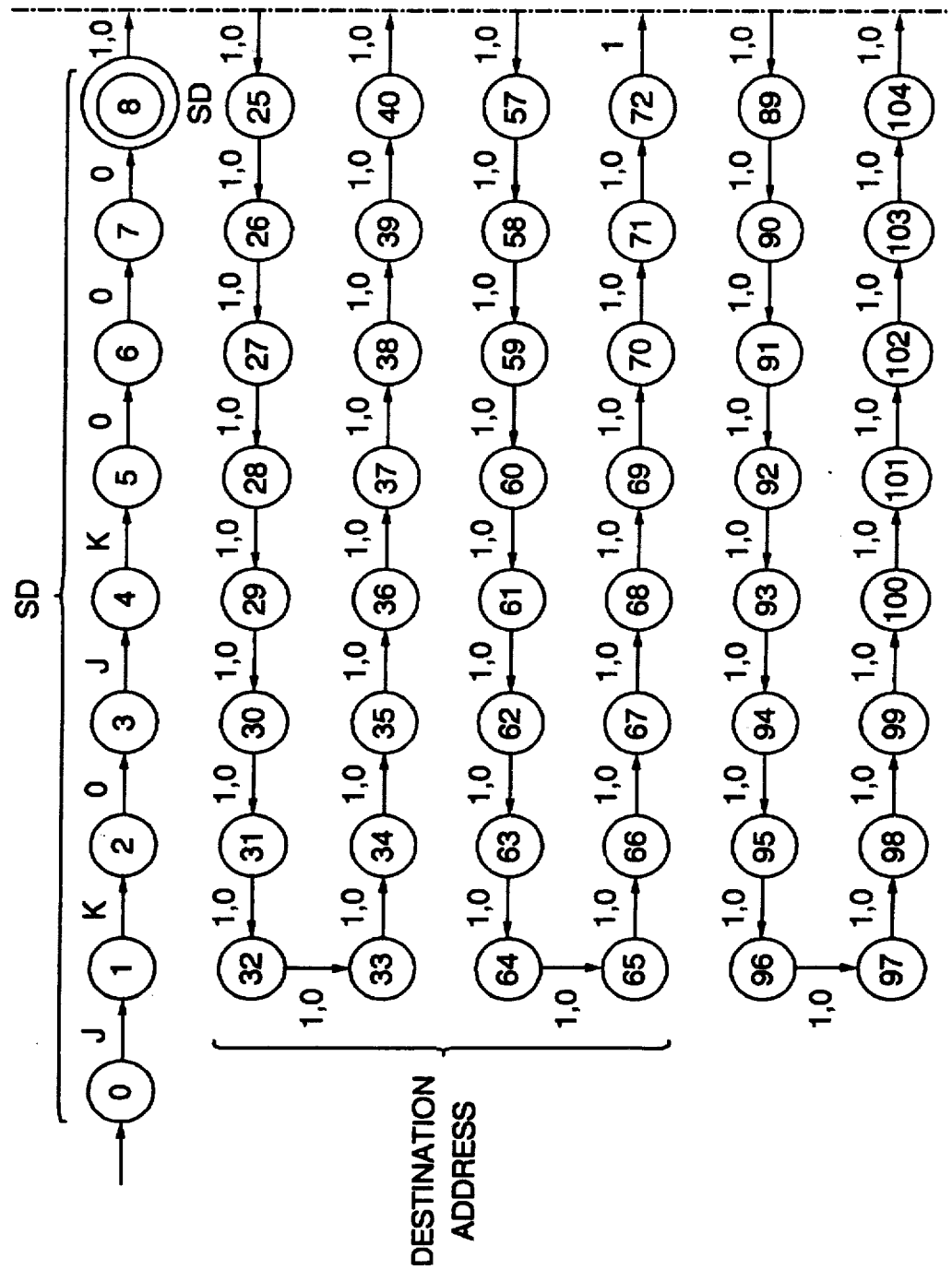
FIG. 5 is an assembly diagram for FIGS. 5A–5H which provide a state diagram for the routing indicator bit and routing information field.
Figure 5B:
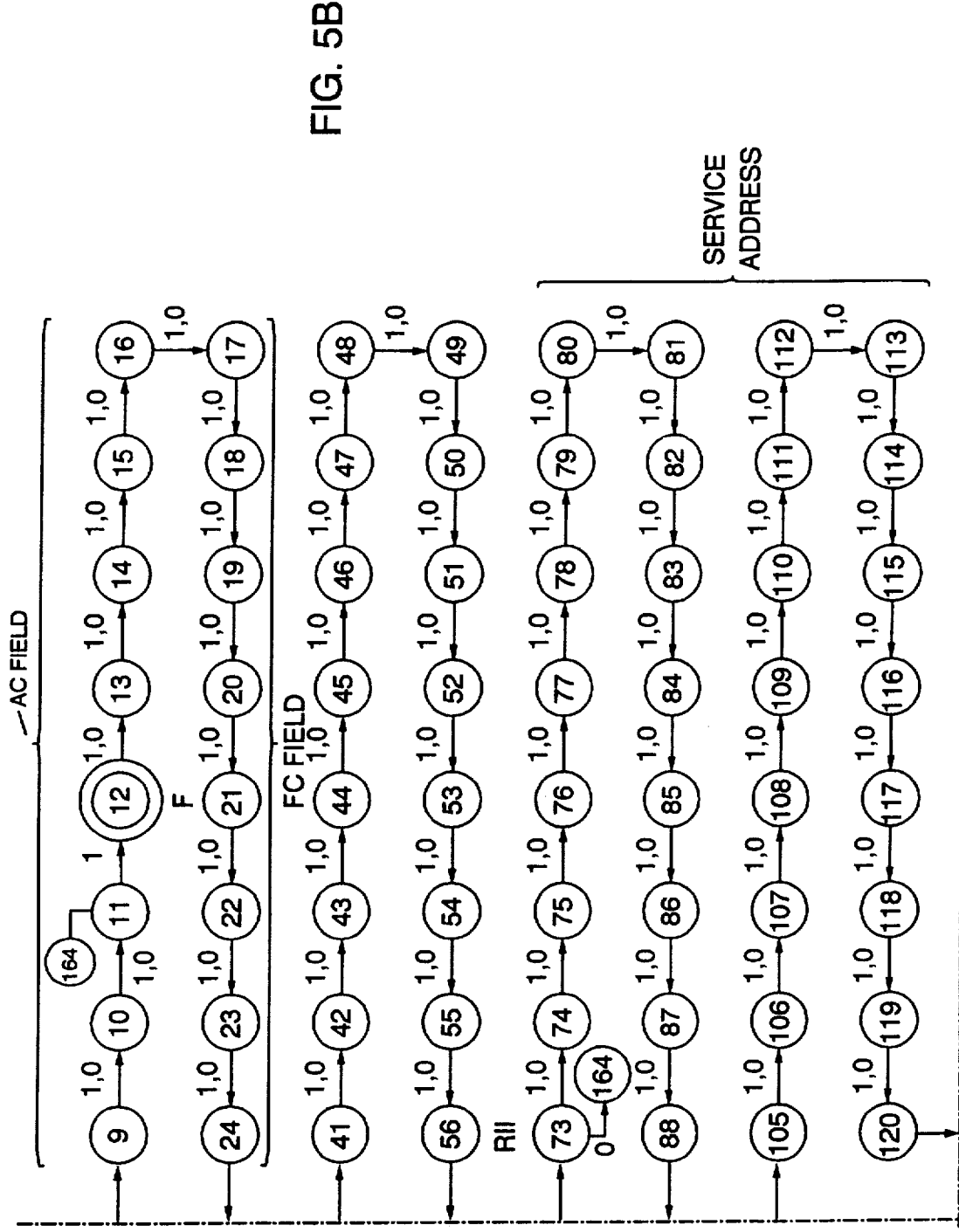
Figures 5, 5C:
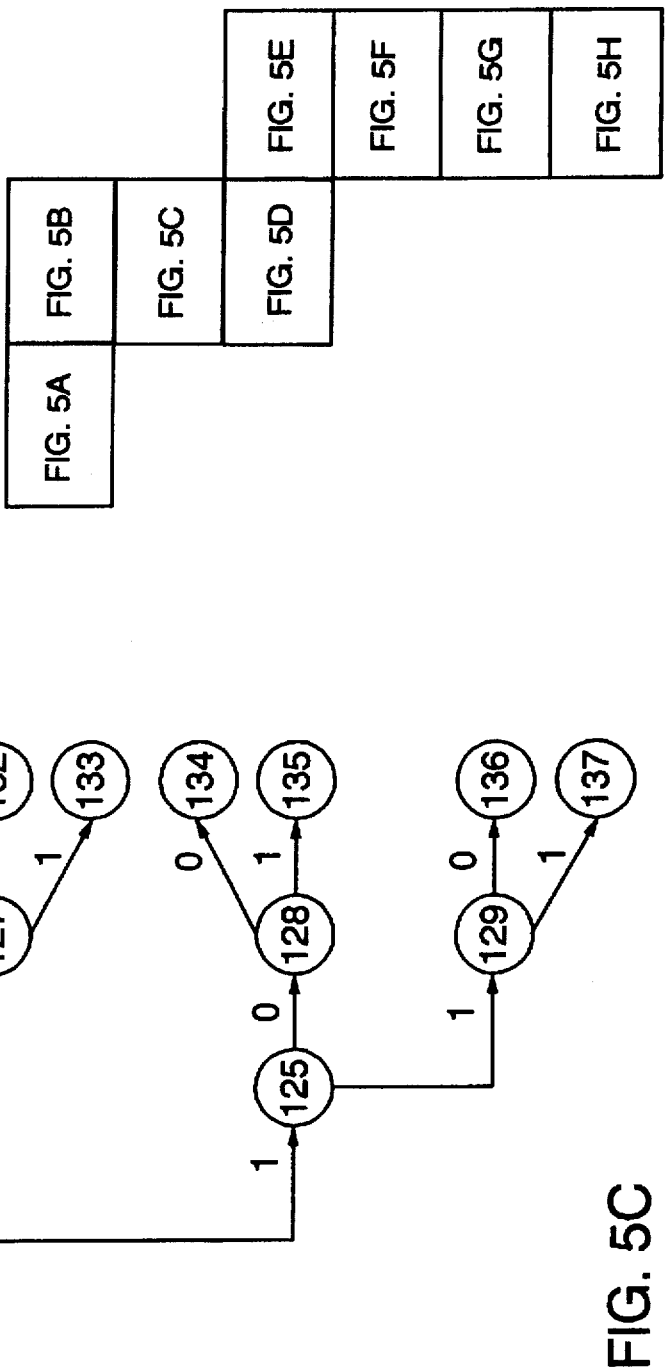
Figures 1, 5D:
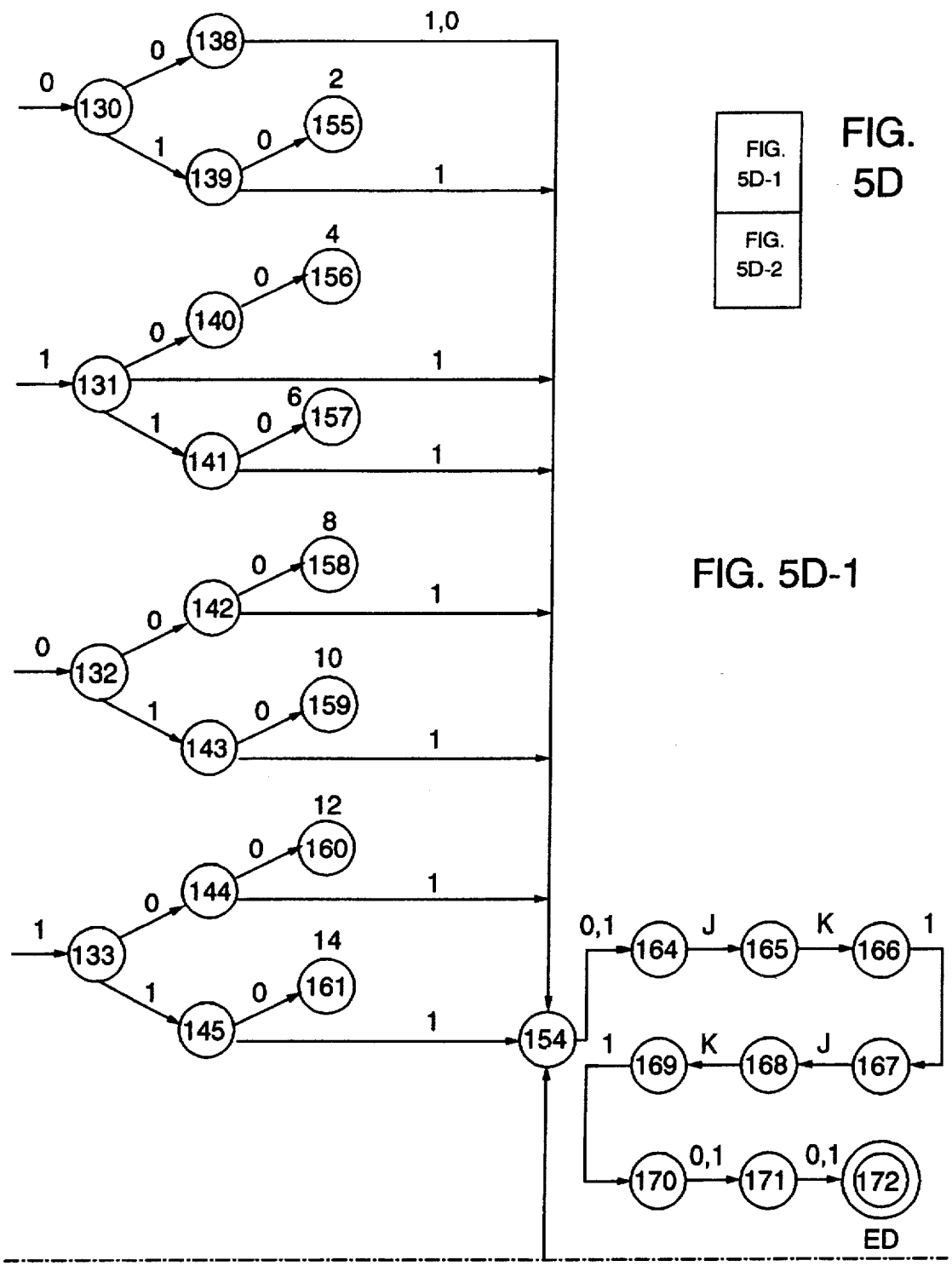
Figures 2, 5D:
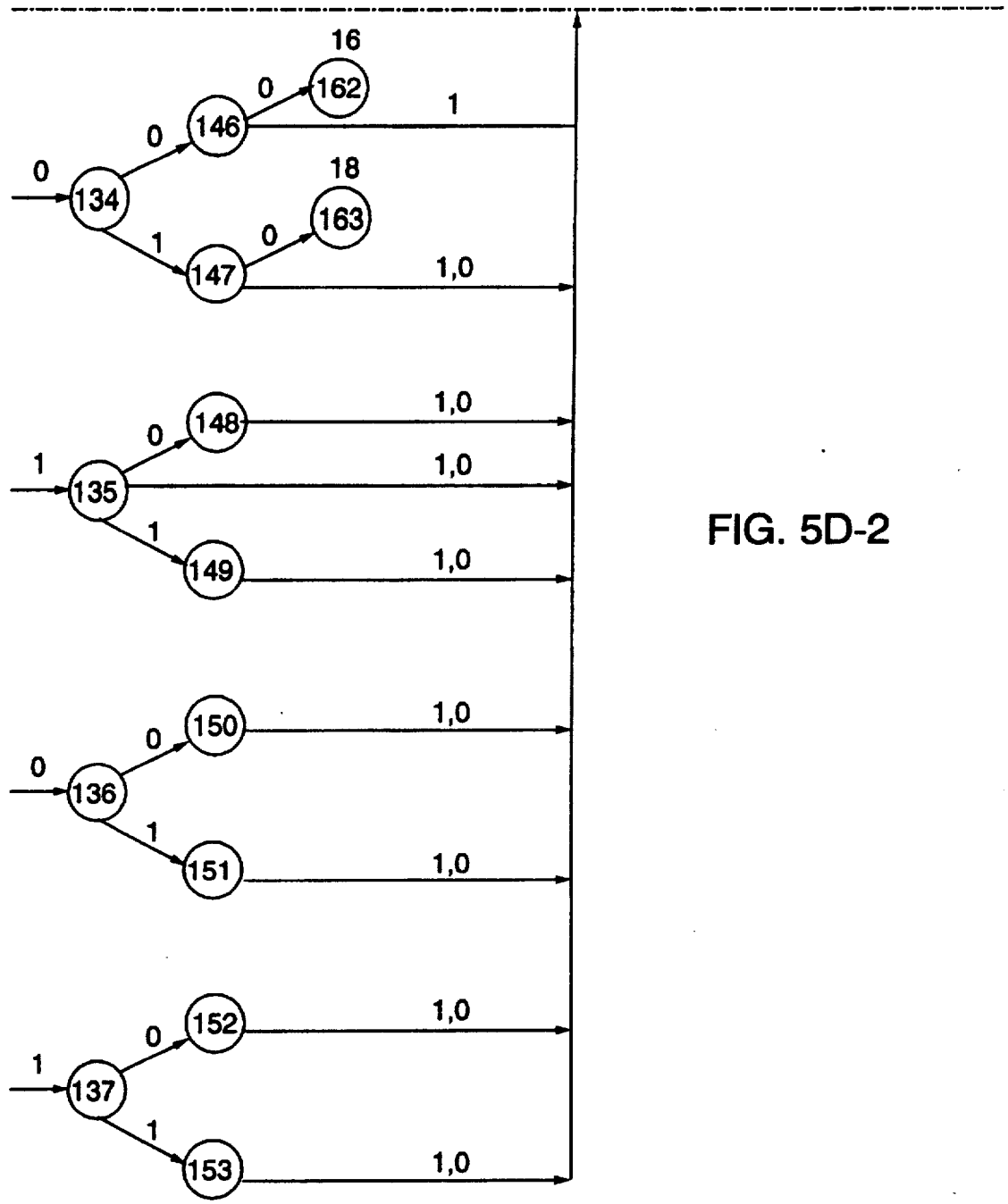
Figures 1, 5E:
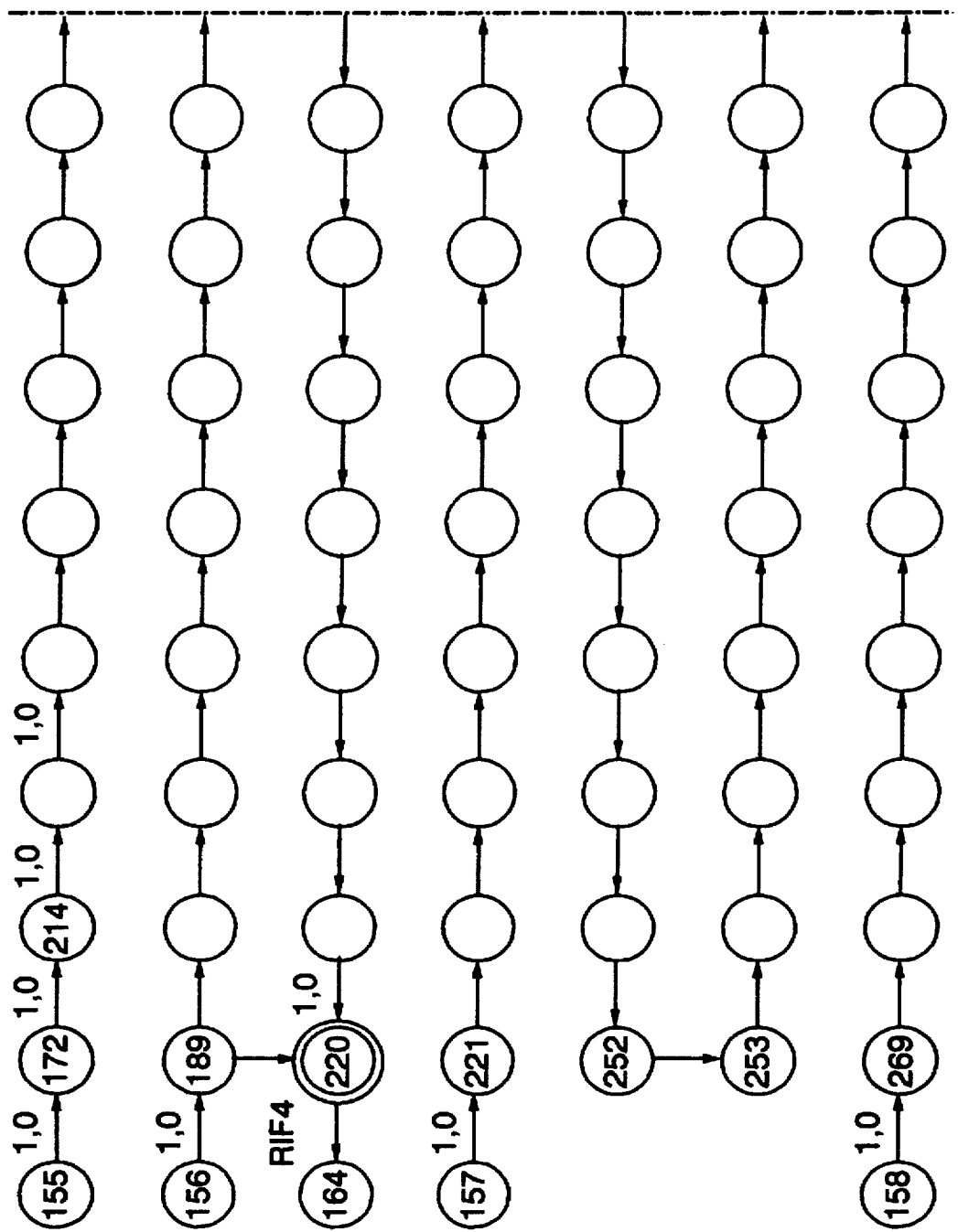
Figures 1, 5F:
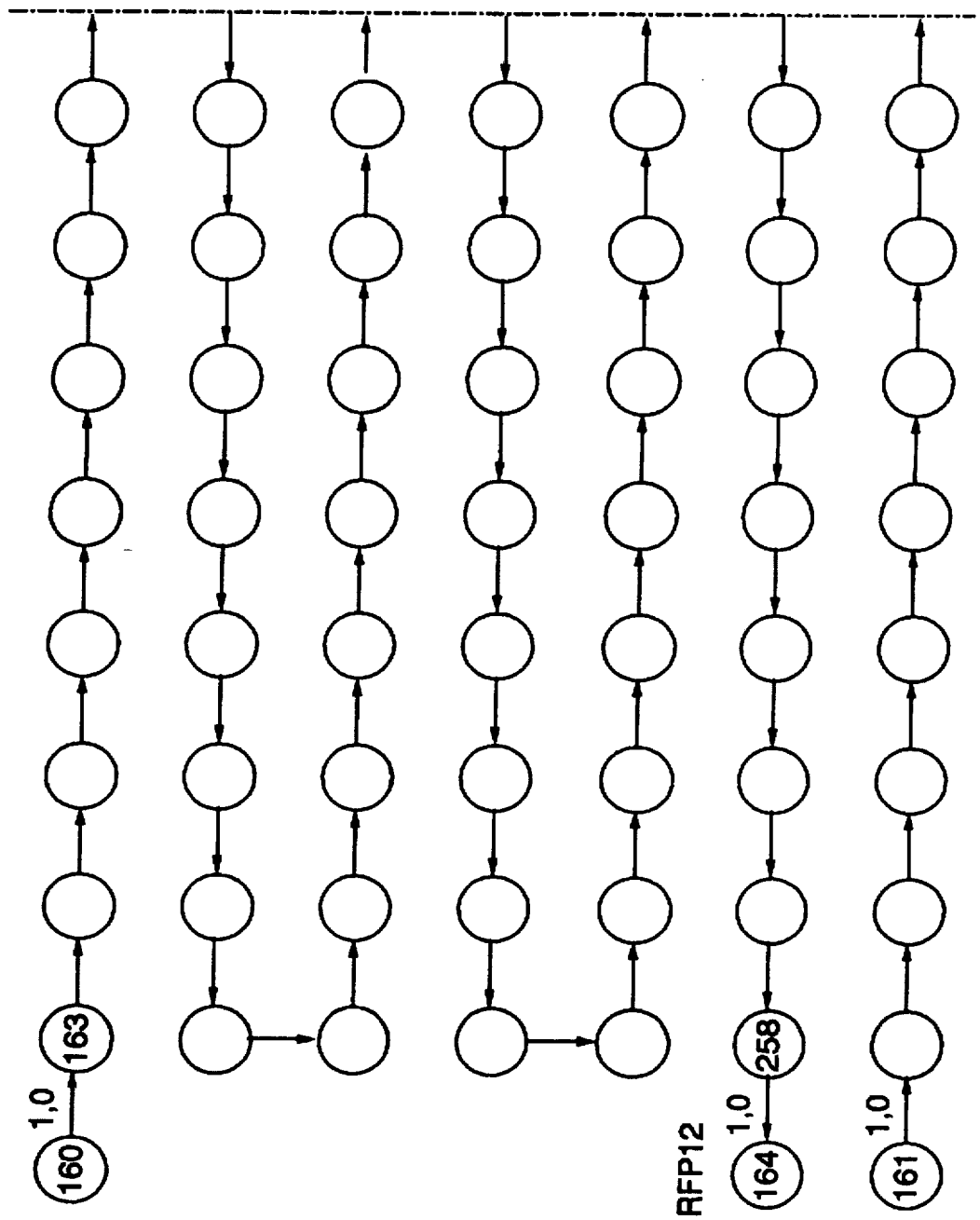
Figures 2, 5F:
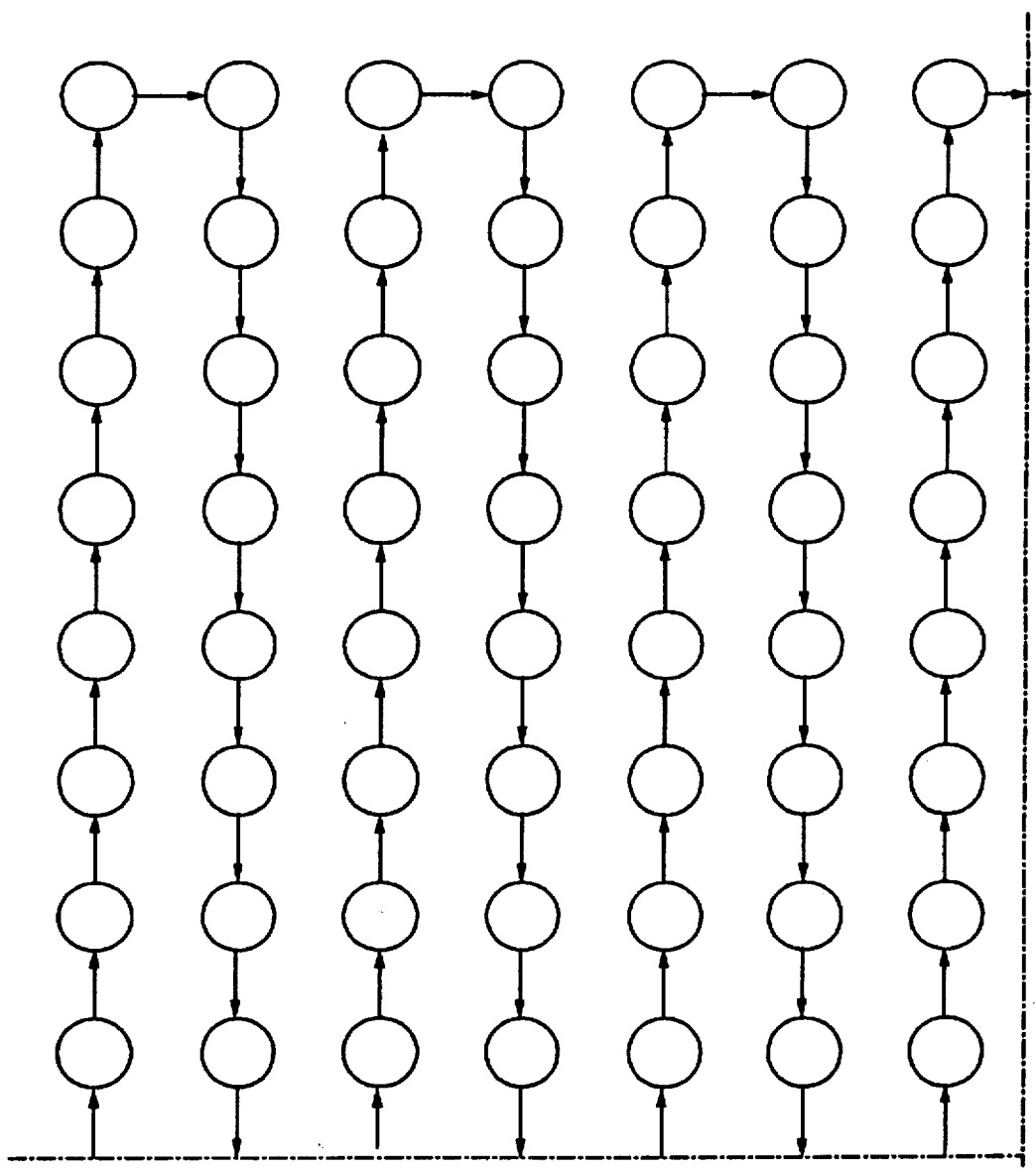
Figures 3, 5F:
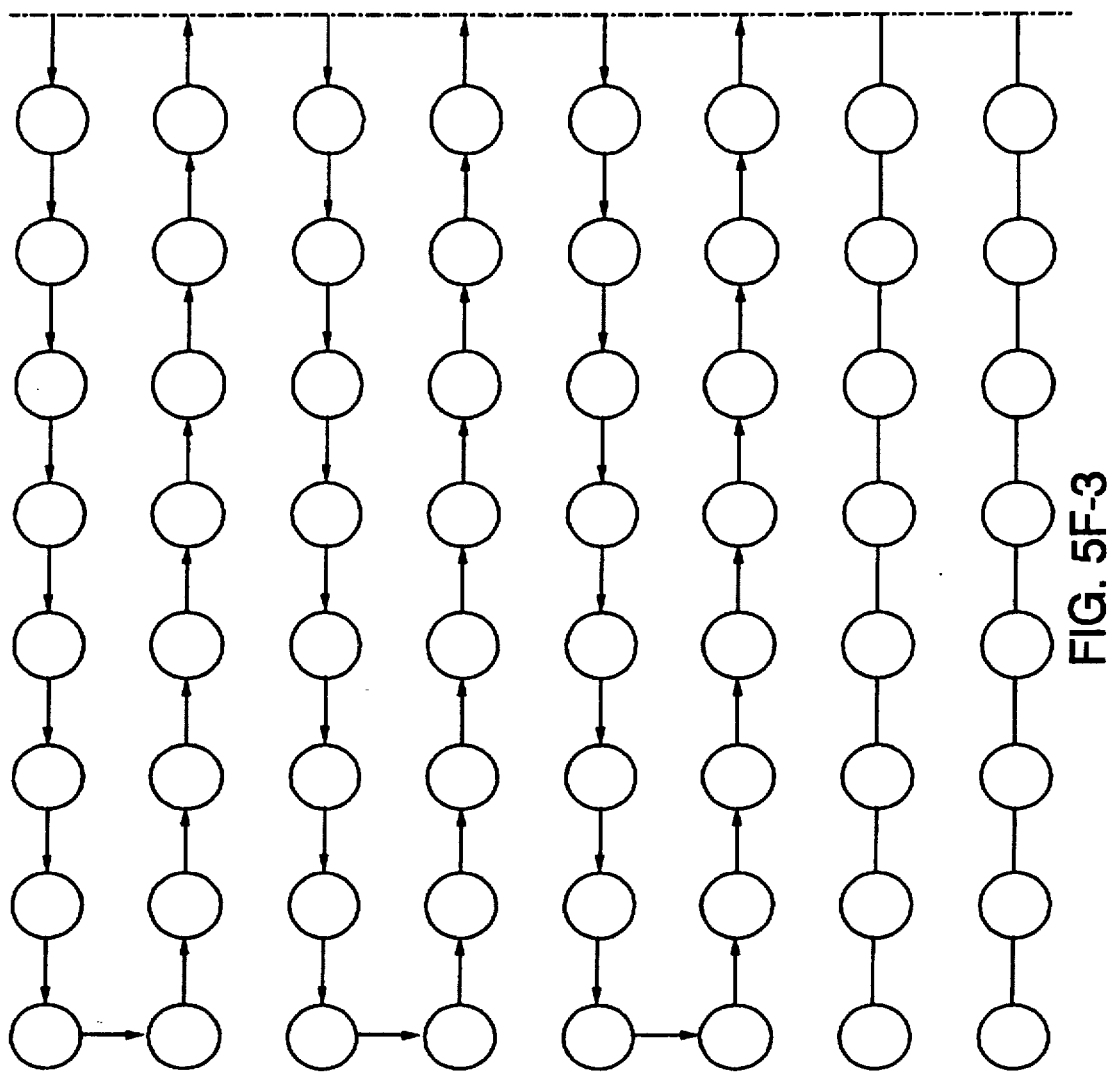
Figures 4, 5F:
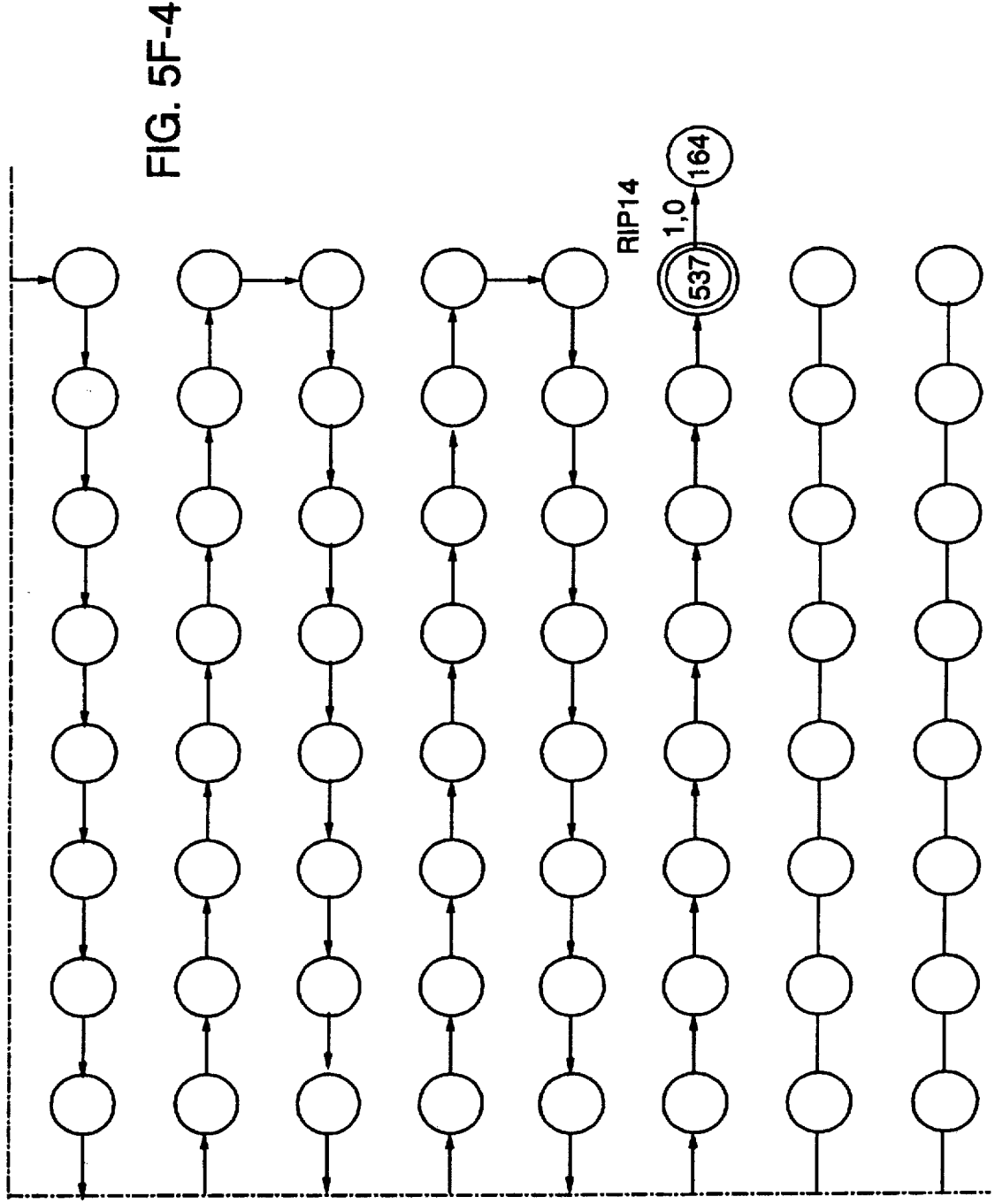
Figures 1, 5G:
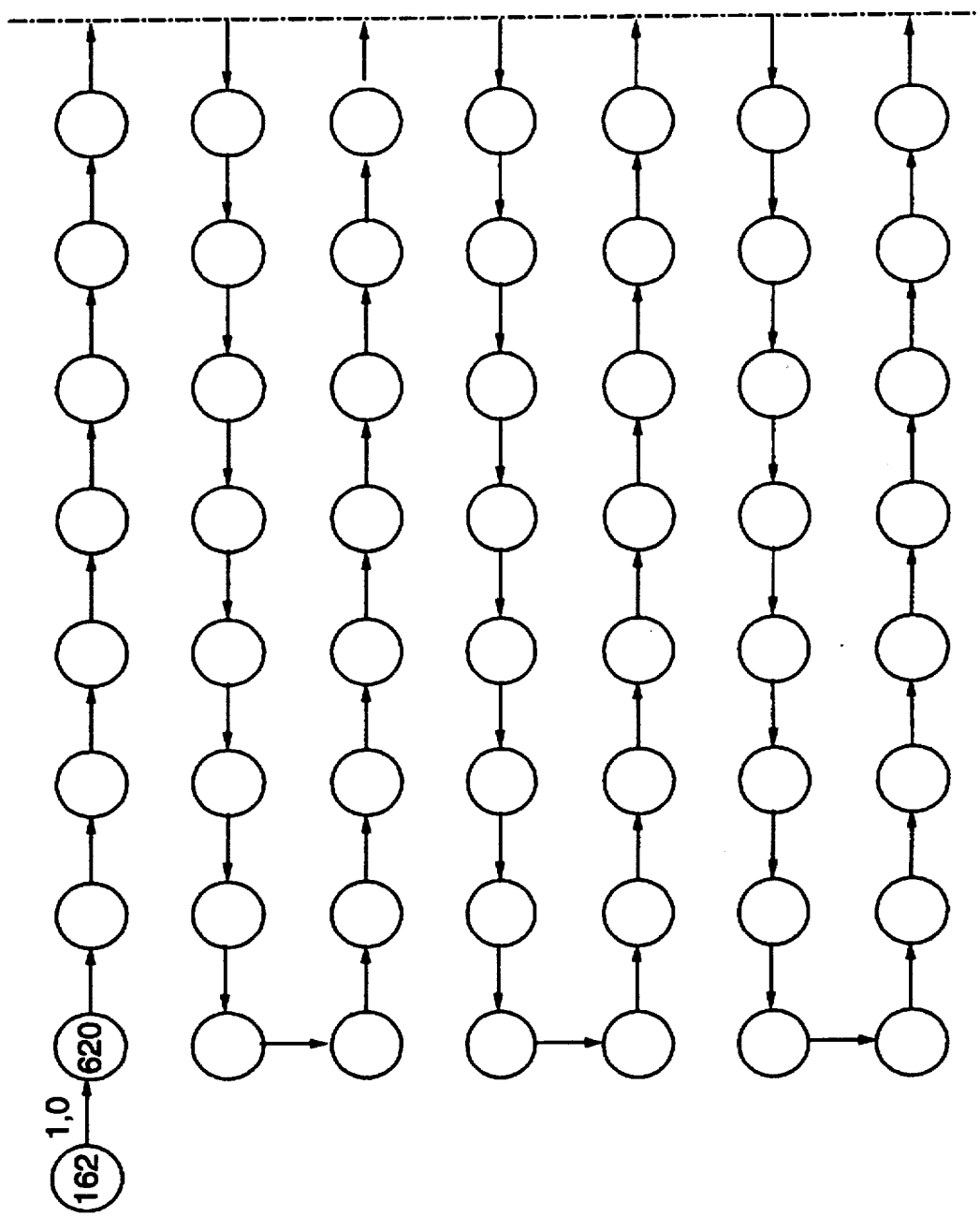
Figures 3, 5G:
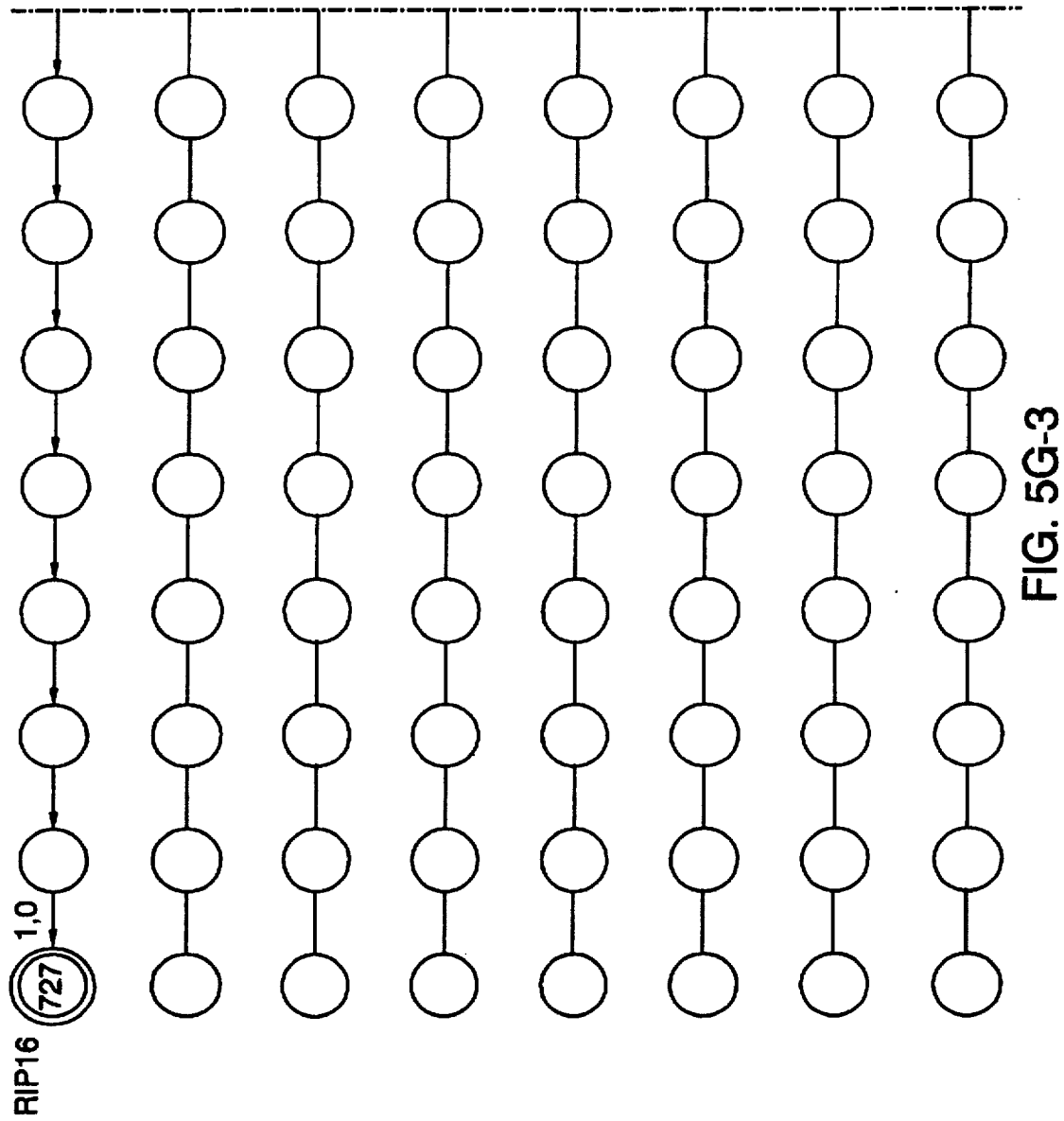
Figures 4, 5G:
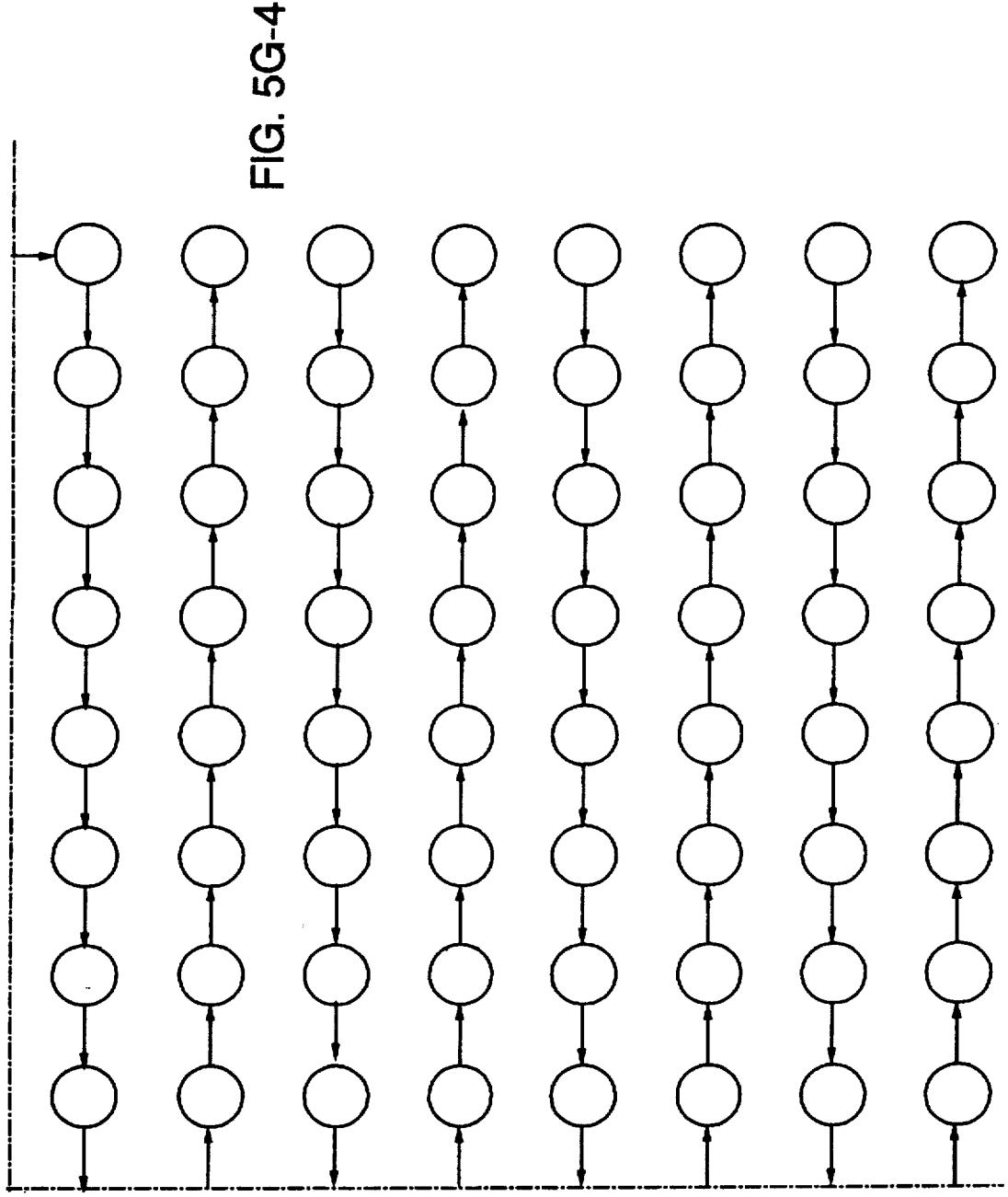
Figures 1, 5H:
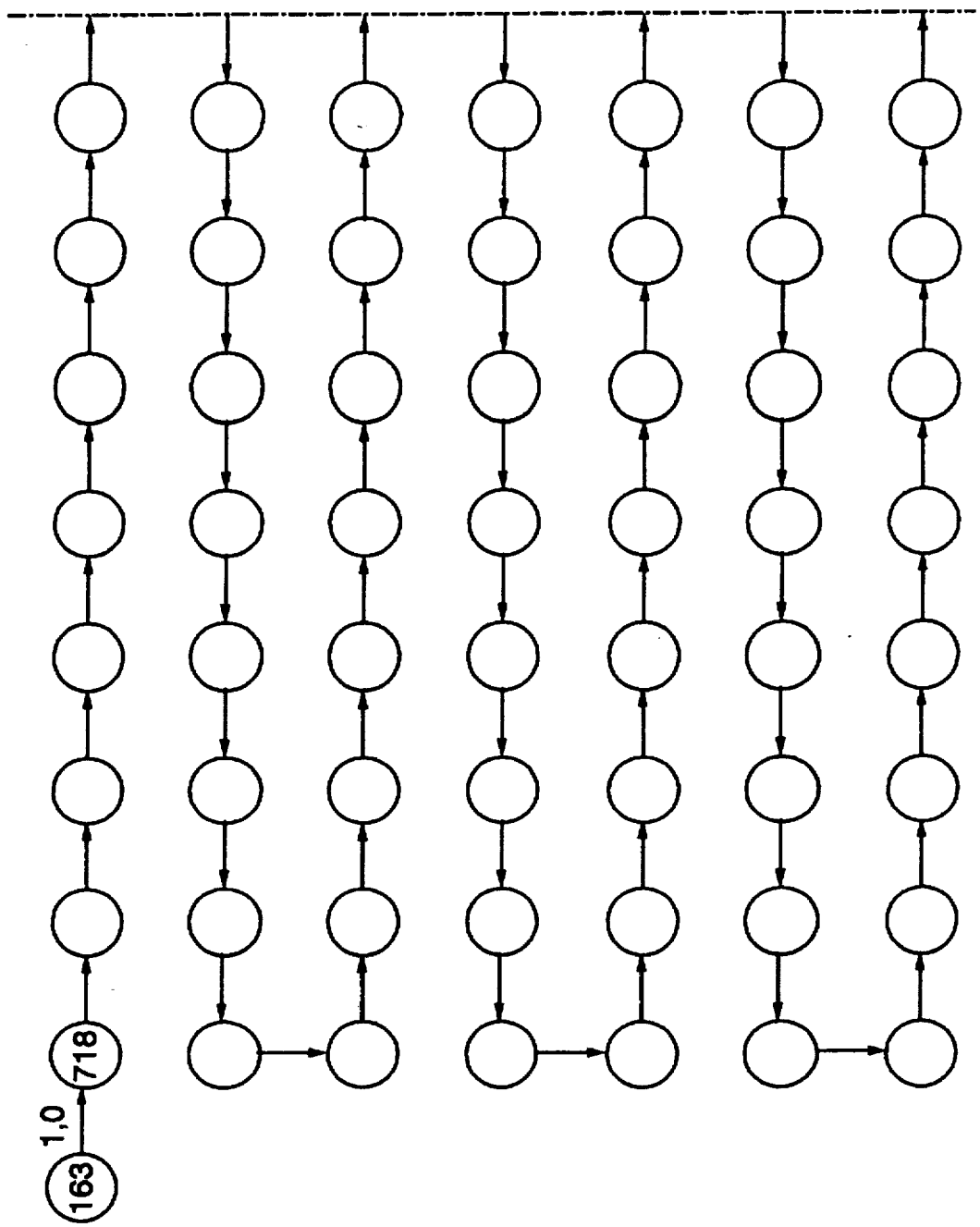
Figures 3, 5H:
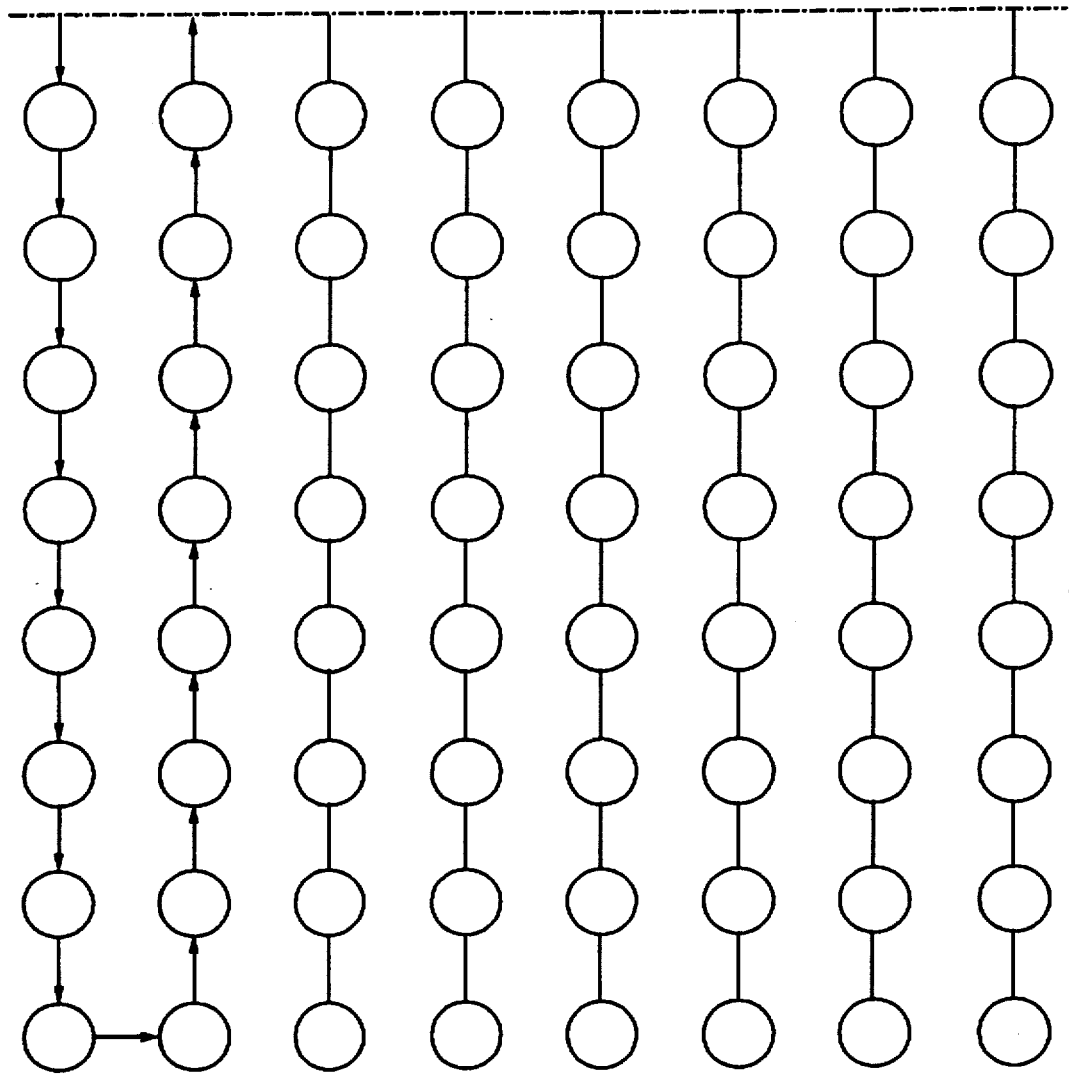
Figures 4, 5H:
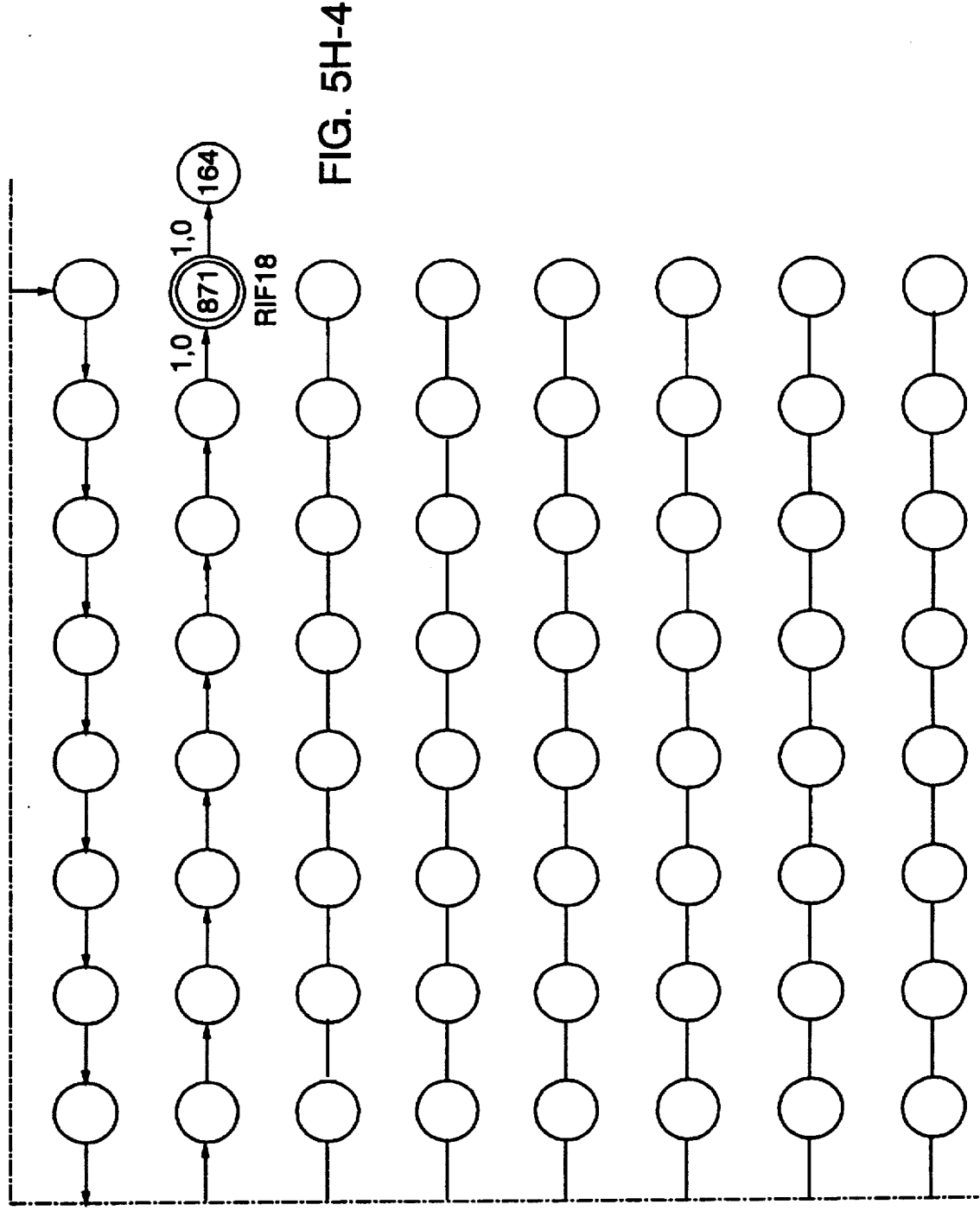

FIG. 5 provides the state diagram for the routing indicator bit and routing information field detection for the IEEE 802.5 token ring network. As shown in this figure, the first characteristic data pattern to be detected is that of a starting delimiter (SD). This pattern is detected when the pattern detection FSM reaches state 8. The next characteristic data pattern is that of frame (F) which is detected at state 12. The frame indicator bit is the fourth bit of the access control field (AC field). When this bit has a value of 1, then a frame is transmitted and received on the token ring network. The next characteristic data pattern is the Routing Bit Indicator (RII) which is detected at state 73. The RII bit is the first bit of the Source Address field. When the RII has a value of 1, then there is a routing information field present in the frame. Otherwise there is no routing field.

If RII has a value of 1, then the routing information field follows the source address field. The routing information field format is presented in FIG. 6. This field includes a two-byte routing control field and up to eight two-byte route designators. The routing control field format is presented in FIG. 7. The first three bits of byte 1 of the routing control field are the broadcast indicator bits. The remaining five bits of byte 1 of the routing control field are the length bits. The length bits indicate the length of the routing information field. The length of the routing information field must be known in order know to where in the data stream the FSM should begin the frame protocol identification detection. The length of the routing information field (in bytes) can be any of the following values: 2, 4, 6, 8, 10, 12, 14, 18.

Figure 4:
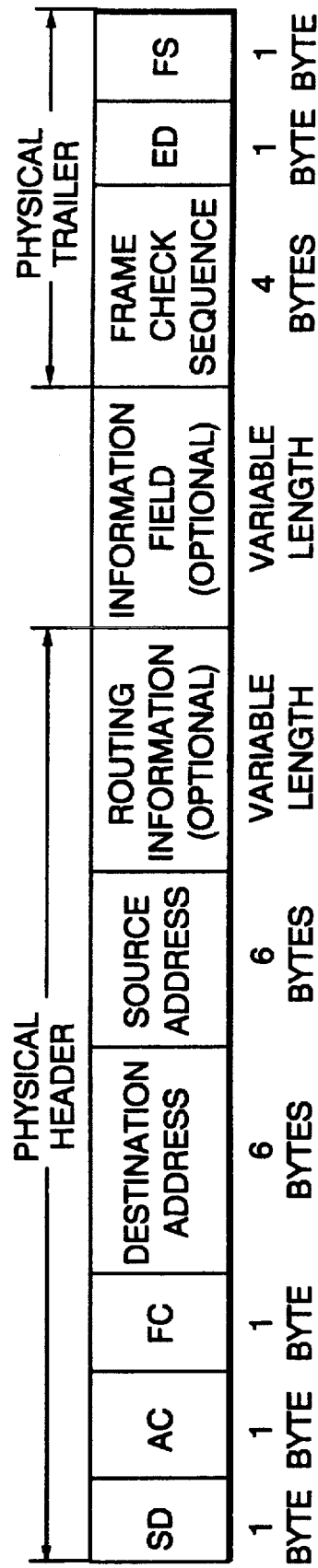
FIG. 4 illustrates the frame format of an IBM 802.5 token ring network.

The frame information field follows the routing information field. In FIG. 4, the frame information field begins with state 164. Notice from these figures that the routing information field ends for a routing information field of length 2 at state 188 with the next state being state 164. We label this state RIF2 to indicate the end of a routing information field of length 2. We label the last states for each different routing information field lengths similarly. The routing information field ends for a routing information field of length 4 at state 220 with the next state being state 164. The routing information field ends for a routing information field of length 6 at state 268 with the next state being state 164. The routing information field ends for a routing information field of length 8 at state 322 with the next state being state 164. The routing information field ends for a routing information field of length 10 at state 402 with the next state being state 164. The routing information field ends for a routing information field of length 12 at state 498 with the next state being state 164. The routing information field ends for a routing information field of length 14 at state 599 with the next state being state 164. The routing information field ends for a routing information field of length 16 at state 727 with the next state being state 164. The routing information field ends for a routing information field of length 18 at state 871 with the next state being state 164.

The bytes following the routing information field contain information that identifies the protocol of the frame. For example the first 50 bytes of the frame information field could identify an IP frame and the next 50 bytes could identify a TCP frame, The next 29 bytes could identify a header for an SNA frame.

Although a specific embodiment of the invention has been disclosed, it will be understood by those having skill in the art that changes can be made to that specific embodiment without departing from the spirit and the scope of the invention.

What is claimed is:

1. In a system for monitoring and controlling a data communications network which communicates a serial stream of binary bits having a characteristic pattern representing a data frame comprising a starting delimiter, a frame sequence field, an end delimiter, a physical control field, and a presence bit, a method for locating a variably placed frame information field in said data frame with respect to said starting delimiter, a method comprising the steps of:

transmitting on the network said data frame which includes said presence bit indicating the presence of a variable length routing field whose length is defined by a length field in said data frame, said length field containing a numeric value indicative of the length of said variable length routing field;

inputting said data frame into a dynamically re-programmable passive digital filter (DRPDF) programmed to identify said starting delimiter and said presence bit;

branching in said DRPDF to a first path in response to said presence bit, to ignore a plurality of bits in said variable length routing corresponding to said numeric value in said length field; and branching in said DRPDF to a second path after said plurality of bits have been ignored, to locate the variably placed frame information field in said data frame; and interpreting in said DRPDF the variably placed frame information field in said data frame for network monitoring and control purposes on a real time basis.

2. In a system for monitoring and controlling a data communications network which communicates a serial stream of binary bits having a characteristic pattern representing a data frame comprising a starting delimiter, a frame sequence field, an end delimiter, a physical control field, and a presence bit, an apparatus for locating a variably placed frame information field in said data frame with respect to said starting delimiter, comprising:

a dynamically re-programmable passive digital filter (DRPDF) having an input coupled to said communications network to receive said serial bit stream; said DRPDF receiving a data frame which includes a presence bit indicating the presence of a variable length routing field whose length is defined by a length field in said data frame, said length field containing a length value indicative of the length of said variable length routing field;

said DRPDF being programmed to identify said presence bit and branching to a first path in response to said presence bit;

a counter coupled to said DRPDF for receiving said length value from said length field of said data frame in response to said presence bit, said length value corresponding to the length of said variable length routing field in said data frame;

said counter counting the number of bits in said variable length routing field and outputting an enabling signal after decrementing the counter to zero based upon the length value stored in the length field;

said DRPDF branching to a second path in response to said enabling signal, to locate said variably placed frame information field in said data frame;

and the DRPDF interpreting such variably placed frame information field for a protocol specific type of data frame on a real time basis.

3. The system of claim 2 wherein the counter is clocked by a clock which clocks the DRPDF in lieu of an external clock for the system.

4. The system of claim 3 wherein the variable length routing field will have passed in the serial bit stream after the counter counts down to zero.

5. The system of claim 4 wherein after the counter counts down to zero the DRPDF performs pattern recognition of the variably placed frame information field sought in the data frame.

6. The method of claim 1 further including the step of the DRPDF locating additional protocol specific types of data frames in the variably placed frame information field.

* * * * *